US010328919B2

(12) United States Patent
Misunou et al.

(10) Patent No.: US 10,328,919 B2
(45) Date of Patent: *Jun. 25, 2019

(54) BRAKE APPARATUS AND BRAKE SYSTEM

(71) Applicant: HITACHI AUTOMOTIVE SYSTEMS, LTD., Hitachinaka-shi, Ibaraki (JP)

(72) Inventors: Masaki Misunou, Atsugi (JP); Ryohei Maruo, Kawasaki (JP); Chiharu Nakazawa, Kawasaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/890,486

(22) PCT Filed: May 23, 2014

(86) PCT No.: PCT/JP2014/063649
§ 371 (c)(1),
(2) Date: Nov. 11, 2015

(87) PCT Pub. No.: WO2014/192643
PCT Pub. Date: Dec. 4, 2014

(65) Prior Publication Data
US 2016/0121864 A1    May 5, 2016

(30) Foreign Application Priority Data

May 27, 2013  (JP) .................................. 2013-111160

(51) Int. Cl.
*B60T 8/40* (2006.01)
*B60T 11/224* (2006.01)
(Continued)

(52) U.S. Cl.
CPC ............. *B60T 11/224* (2013.01); *B60T 7/042* (2013.01); *B60T 8/4081* (2013.01); *B60T 11/16* (2013.01);
(Continued)

(58) Field of Classification Search
CPC ...... B60T 8/4081; B60T 8/4086; B60T 8/409; B60T 8/4077
See application file for complete search history.

(56) References Cited

U.S. PATENT DOCUMENTS 4,326,379 A * 4/1982 Dauvergne ............ B60T 13/143
60/550
6,464,307 B1   10/2002 Yoshino
(Continued)

FOREIGN PATENT DOCUMENTS

JP      64-036554 A     2/1989
JP      2001-213295 A   8/2001
(Continued)

OTHER PUBLICATIONS

JP 2005239001A machine translation to English. 2005.*
(Continued)

*Primary Examiner* — Michael Leslie
*Assistant Examiner* — Michael Quandt
(74) *Attorney, Agent, or Firm* — Foley & Lardner LLP

(57) ABSTRACT

A brake apparatus is provided which has applicability to a wide range of vehicles. The brake apparatus includes a master cylinder provided in such a manner that a piston is axially operable in a master cylinder housing, and a stroke simulator including a reaction force piston axially operable by brake fluid introduced into a stroke simulator housing. The master cylinder housing is fixed to the stroke simulator housing. The stroke simulator housing is positioned between the master cylinder housing and a fixation piece structured
(Continued)

to fix the stroke simulator housing to the vehicle. The fixation piece is spaced from the master cylinder housing.

12 Claims, 10 Drawing Sheets

(51) Int. Cl.
*B60T 7/04* (2006.01)
*B60T 11/16* (2006.01)
*B60T 11/26* (2006.01)
*B60T 11/28* (2006.01)
*B60T 8/36* (2006.01)

(52) U.S. Cl.
CPC ............... *B60T 11/26* (2013.01); *B60T 11/28* (2013.01); *B60T 8/3685* (2013.01); *B60T 8/409* (2013.01)

(56) References Cited

U.S. PATENT DOCUMENTS

| | | | |
|---|---|---|---|
| 7,032,982 B2 * | 4/2006 | Ogiwara | B60T 8/4081 |
| | | | 303/114.1 |
| 2005/0067885 A1 | 3/2005 | Ogiwara et al. | |
| 2013/0232967 A1 | 9/2013 | Murayama et al. | |

FOREIGN PATENT DOCUMENTS

| | | | |
|---|---|---|---|
| JP | 2005-104334 A | | 4/2005 |
| JP | 2005239001 A | * | 9/2005 |
| JP | 2006-151220 A | | 6/2006 |
| JP | 2007176277 A | * | 7/2007 |
| JP | 2007-203891 A | | 8/2007 |
| JP | 2008-238834 A | | 10/2008 |
| JP | 2012-106638 A | | 6/2012 |
| WO | WO 99/39956 | | 8/1999 |

OTHER PUBLICATIONS

JP 2007176277A machine translation to English. 2007.*
JP 2006151220A machine translation to English. 2006.*
Misunou: Non-Final Office Action for U.S. Appl. No. 14/774,553 dated Jan. 12, 2017.
Misunou: Non-Final Office Action for U.S. Appl. No. 14/774,553 dated Apr. 2, 2018.
Misuno: Final Office Action for U.S. Appl. No. 14/774,553 dated Jul. 31, 2017.
Misunou: Notice of Allowability for U.S. Appl. No. 14/774,553 dated Sep. 28, 2018.
Misunou: Corrected Notice of Allowance for U.S. Appl. No. 14/774,553 dated Oct. 22, 2018.

* cited by examiner

BRAKE APPARATUS AND BRAKE SYSTEM

TECHNICAL FIELD

The present invention relates to a brake apparatus.

BACKGROUND ART

Conventionally, there has been known a brake apparatus for a vehicle. For example, a brake apparatus (an input apparatus of a brake system for a vehicle) discussed in Patent Literature 1 includes a master cylinder and a stroke simulator provided integrally with each other.

CITATION LIST

Patent Literature

[PTL 1] Japanese Patent Application Public Disclosure No. 2012-106638

SUMMARY OF INVENTION

Technical Problem

However, the master cylinder comes in various types according to an automobile rank. In the conventional brake apparatus, the master cylinder and the stroke simulator are formed with use of a housing shared by them, which leads to the necessity of designing and manufacturing the housing for each of the various types of master cylinders. This necessity may make it difficult to divert the brake apparatus for use for another type of vehicle, and thus prevent the brake apparatus from being applicable to a wide range of vehicles. An object of the present invention is to provide a brake apparatus capable of improving applicability to the wide range of vehicles.

Solution to Problem

To achieve the above-described object, in a brake apparatus according to the present invention, a master cylinder housing is fixed to a stroke simulator housing.

Advantageous Effects of Invention

Therefore, the present invention can improve the applicability to the wide range of vehicles.

DESCRIPTION OF EMBODIMENTS

In the following description, embodiments for embodying a brake apparatus according to the present invention will be described with reference to the drawings.

First Embodiment

A vehicle to which a brake apparatus according to the present embodiment is applied is an electrically-powered vehicle capable of generating a regenerative braking force by electric machinery. Examples of the electrically-powered vehicle include a hybrid vehicle including an electric motor (a generator) besides an engine (an internal combustion engine) as a prime mover for driving a wheel, and an electric vehicle including only the motor (the generator). A system for braking the vehicle (a brake system) according to the present embodiment is a hydraulic brake system that generates a brake force by applying a brake hydraulic pressure to each of wheels of the vehicle. A wheel cylinder (a caliper) mounted on each of the wheels of the vehicle generates a brake applying hydraulic pressure (a wheel cylinder hydraulic pressure) by receiving supply of a brake operation hydraulic pressure or a controlled hydraulic pressure. The brake system includes a brake apparatus 1 as an input apparatus to which a driver's brake operation is input, and an electric brake actuator (hereinafter referred to as an actuator 8) capable of generating the brake hydraulic pressure based on an electric signal according to the driver's brake operation. The brake apparatus 1 operates according to the driver's brake operation, and generates a master cylinder hydraulic pressure as the brake operation hydraulic pressure. The actuator 8 is provide as a separate member from the brake apparatus 1, and controls the wheel cylinder hydraulic pressure (the brake hydraulic pressure) according to a state of the brake operation or a state of the vehicle.

Figure 1:
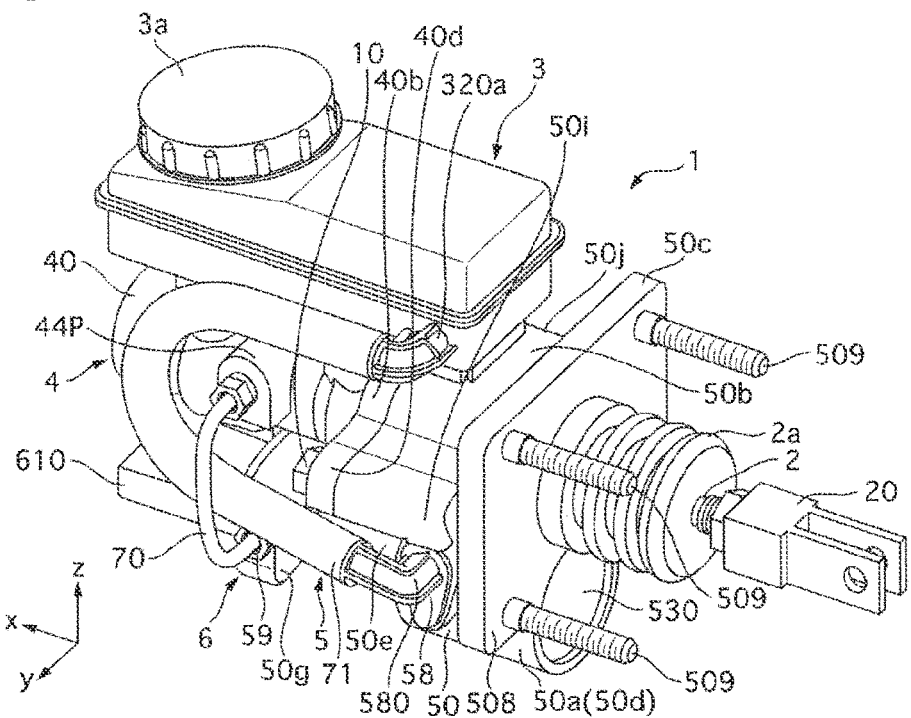
FIG. 1 is a perspective view of a brake apparatus 1 according to a first embodiment.
Figure 2:
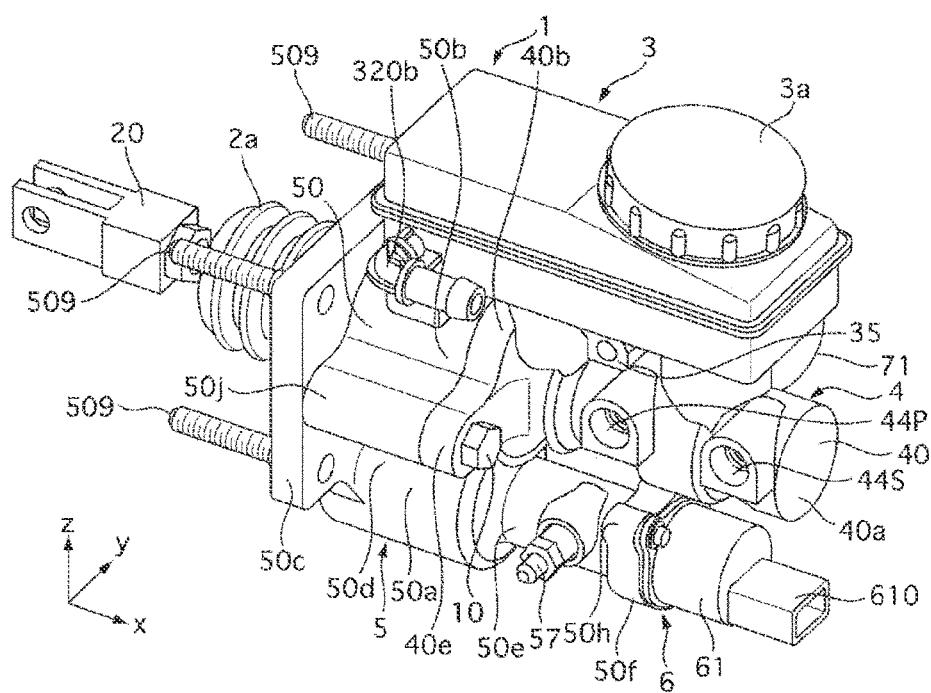
FIG. 2 is a perspective view of the brake apparatus 1 according to the first embodiment.
Figure 3:
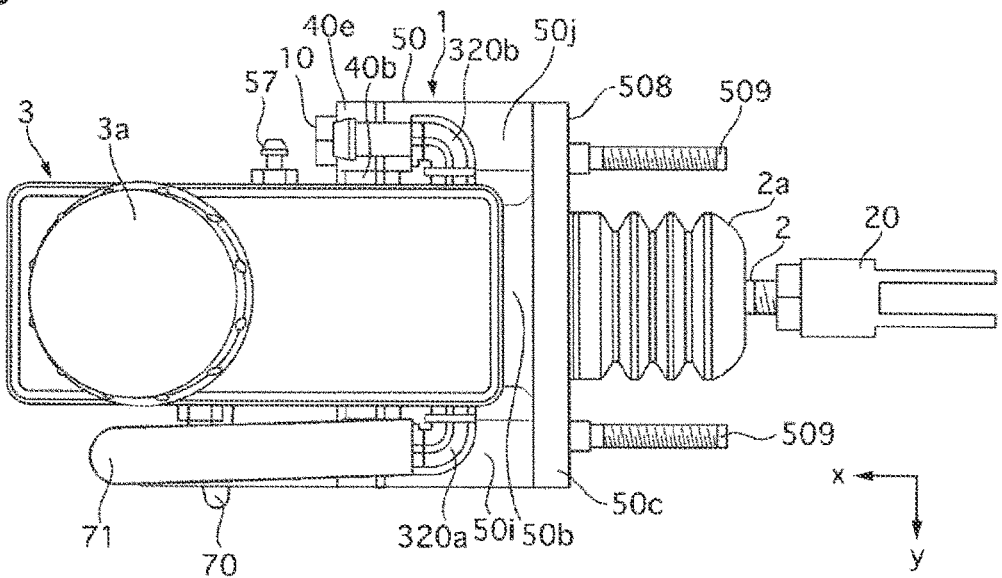
FIG. 3 is a top view of the brake apparatus 1 according to the first embodiment.
Figure 4:
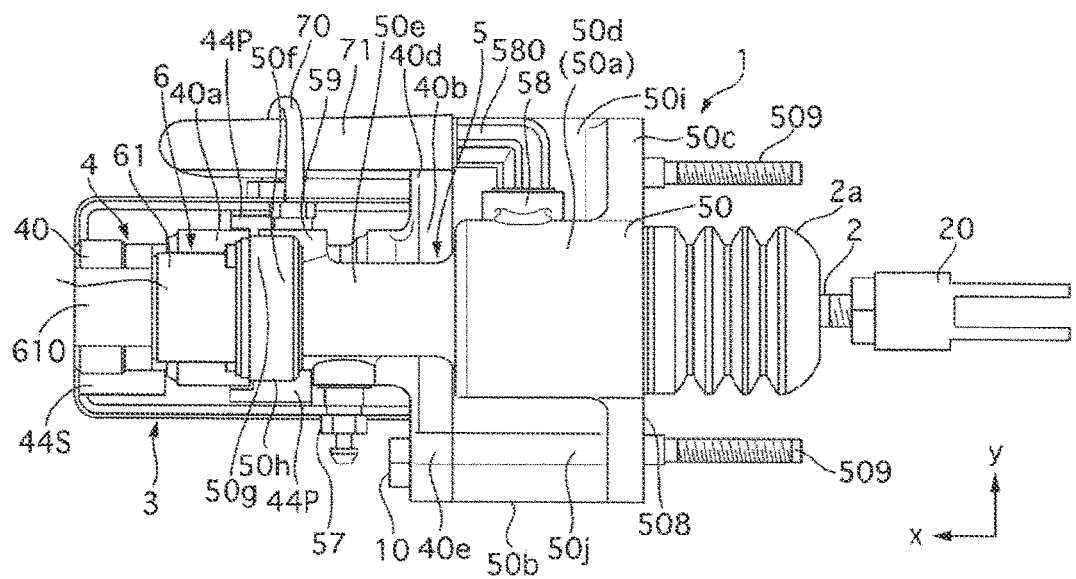
FIG. 4 is a bottom view of the brake apparatus 1 according to the first embodiment.
Figure 5:
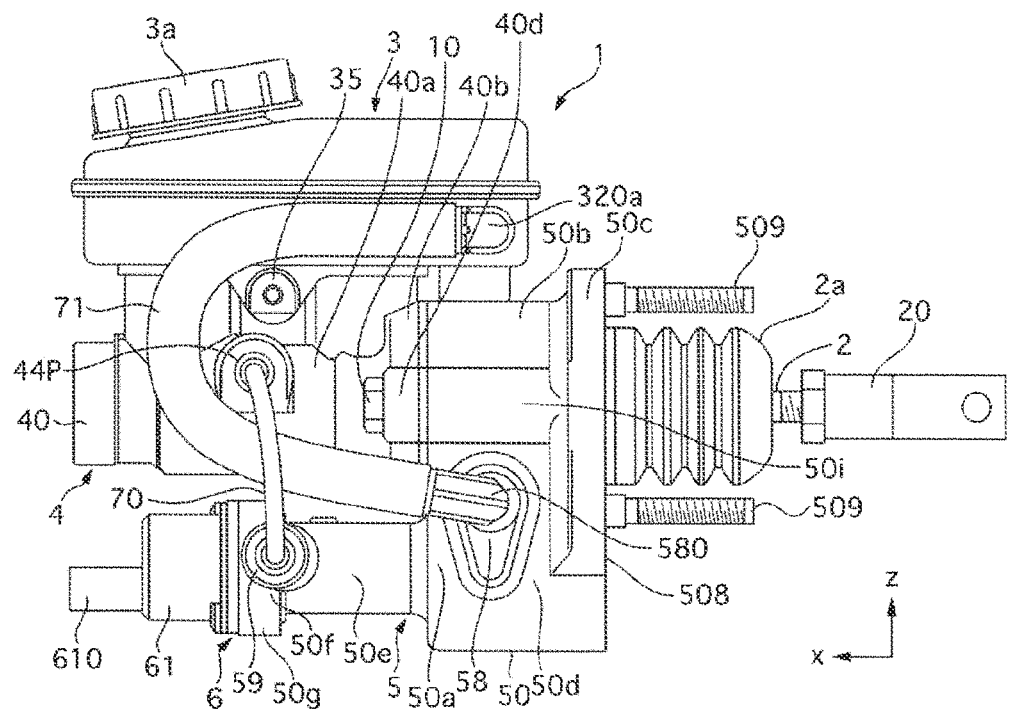
FIG. 5 is a side view of the brake apparatus 1 according to the first embodiment.
Figure 6:
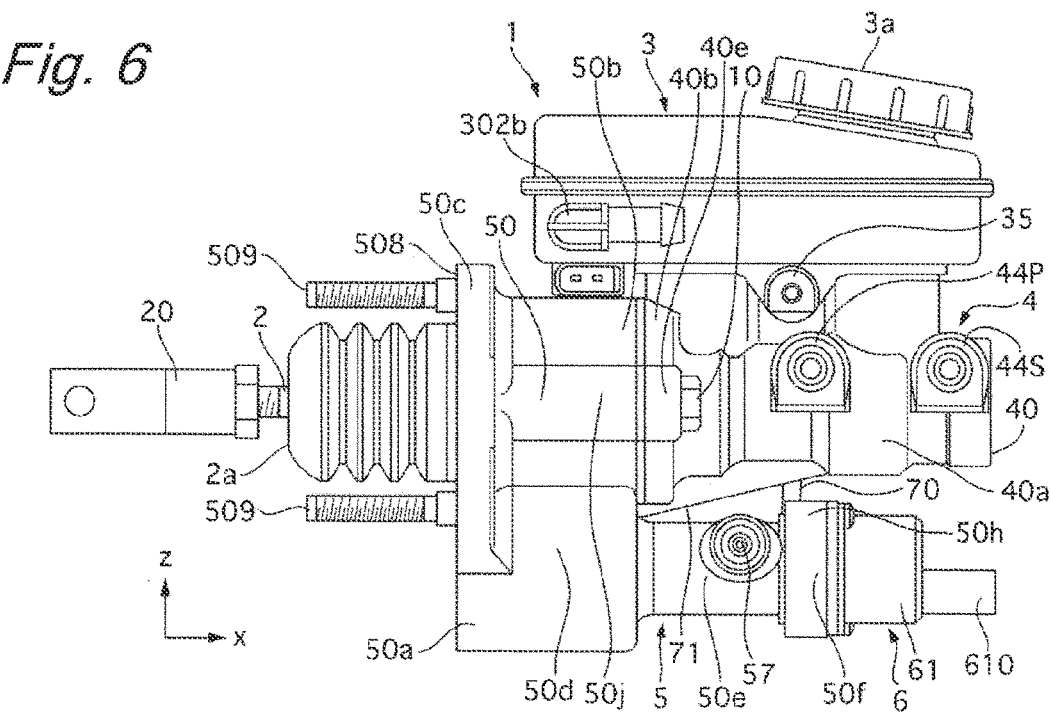
FIG. 6 is a side view of the brake apparatus 1 according to the first embodiment.
Figure 7:
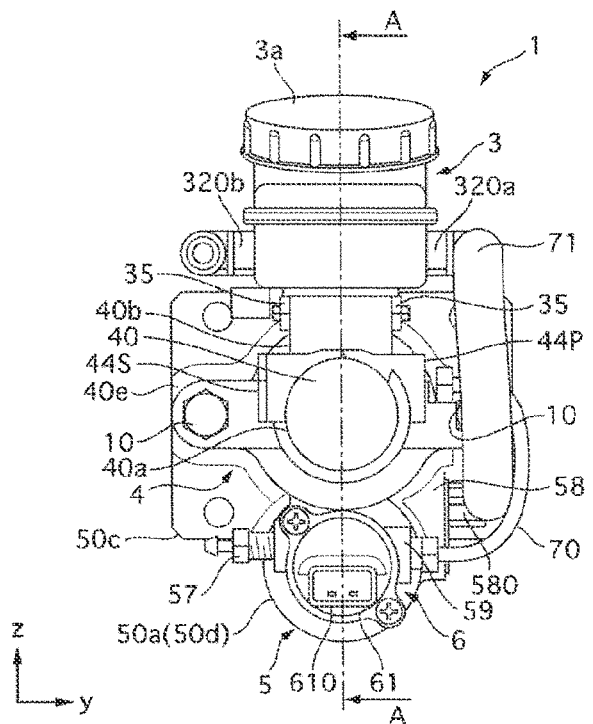
FIG. 7 is a front view of the brake apparatus 1 according to the first embodiment.
Figure 8:
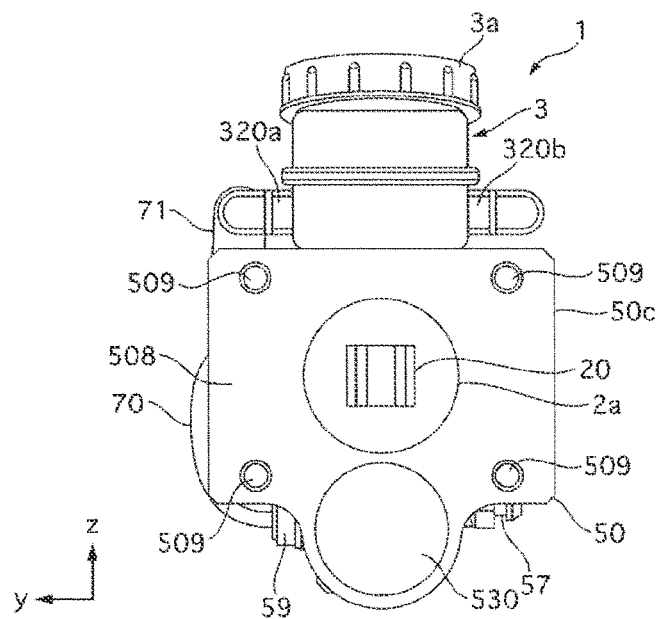
FIG. 8 is a rear view of the brake apparatus 1 according to the first embodiment.
Figure 9:
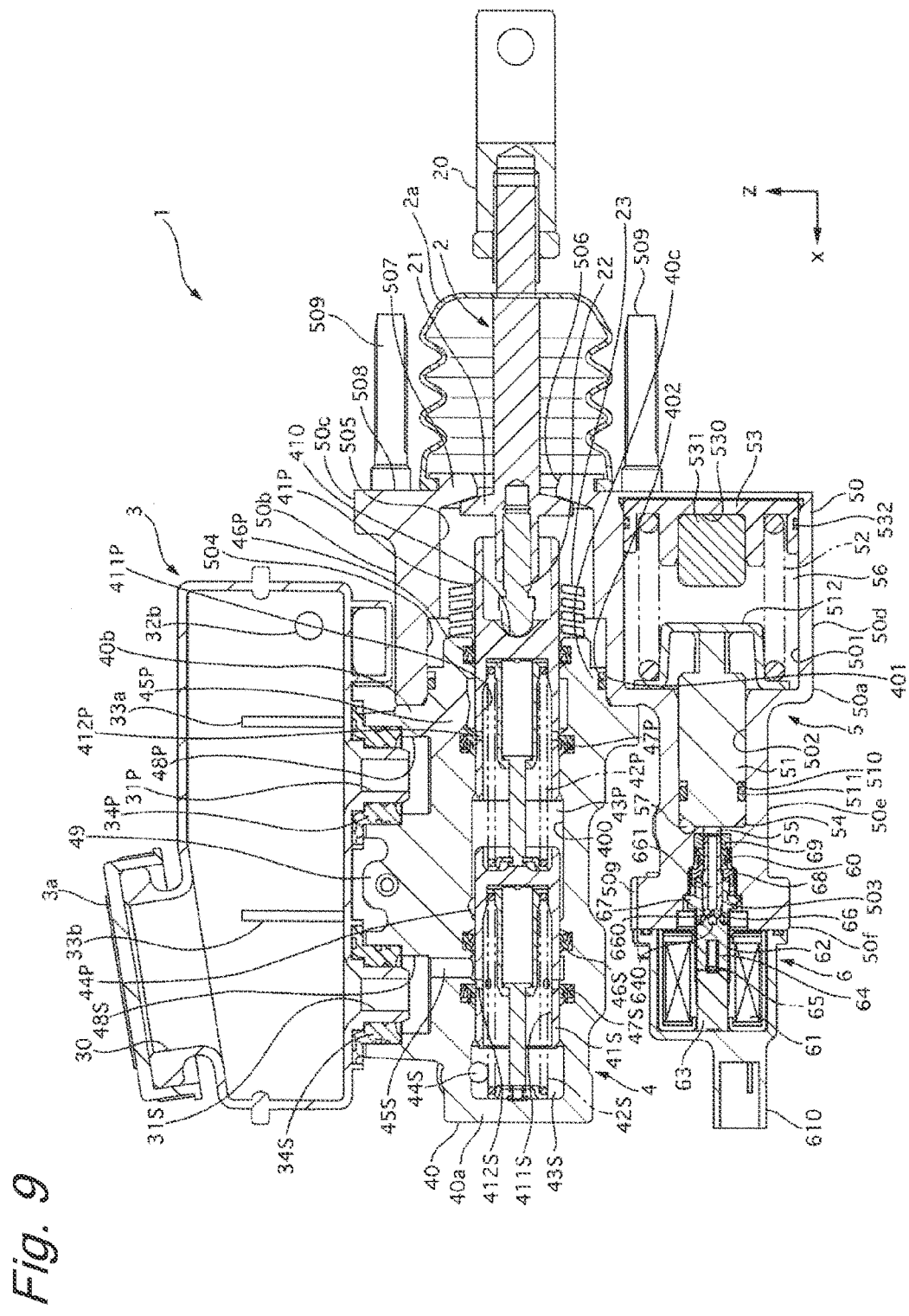
FIG. 9 is a cross-sectional view taken along a line A-A illustrated in FIG. 7.

FIGS. 1 to 9 illustrate the entire brake apparatus 1 according to the present embodiment as viewed from various directions. In the following description, an orthogonal coordinate system is set up for convenience of the description. An x axis is set along a front-rear direction of the vehicle (an axial direction in which the master cylinder 4 operates) when the brake apparatus 1 is mounted on the vehicle. Because the axial direction of the master cylinder 4 extends generally in parallel with the front-rear direction of the vehicle when the brake apparatus 1 is mounted on the vehicle, an x-axis direction coincides with the front-rear direction of the vehicle. A positive side in the x-axis direction is set to a front side of the vehicle (a direction in which pistons 41 of the master cylinder 4 stroke according to an operation of pressing a brake pedal). A y axis is set along a width direction of the vehicle (a left-right direction or a lateral direction), and a positive side in a y-axis direction is set to a left side as viewed from a rear side of the vehicle (a negative side in the x-axis direction). A z axis is set along a top-down direction (a vertical direction) of the vehicle, and a positive side in a z-axis direction is set to a top side of the vehicle (a side where a reservoir tank 3 is mounted on the master cylinder 4). FIG. 1 is a perspective view of the brake apparatus 1 as viewed from the negative side in the x-axis direction, the positive side in the y-axis direction, and the positive side in the z-axis direction. FIG. 2 is a perspective view of the brake apparatus 1 as viewed from the positive side in the x-axis direction, a negative side in the y-axis direction, and the positive side in the z-axis direction. FIG. 3 is a top view of the brake apparatus 1 as viewed from the positive side in the z-axis direction. FIG. 4 is a bottom view of the brake apparatus 1 as viewed from a negative side in the z-axis direction. FIG. 5 is a side view of the brake apparatus 1 as viewed from the positive side in the y-axis direction. FIG. 6 is a side view of the brake apparatus 1 as viewed from the negative side in the y-axis direction. FIG. 7 is a front view of the brake apparatus 1 as viewed from the positive side in the x-axis direction. FIG. 8 is a rear view of the brake apparatus 1 as viewed from the negative side in the x-axis direction. FIG. 9 is a cross-sectional view of the brake apparatus 1 taken along a plane passing through an axial center of the master cylinder 4, and illustrates a cross section of FIG. 7 taken along an A-A line illustrated in FIG. 7 and viewed from a direction indicated by an arrow.

The brake apparatus 1 includes a push rod 2, a reservoir tank 3, the master cylinder 4, a stroke simulator 5, and a stroke simulator valve 6. In other words, the brake apparatus 1 is a master cylinder unit including the master cylinder 4 built therein. The brake system includes two brake pipe systems (a primary P system and a secondary S system). Hereinafter, members and structures provided in correspondence to the P system and the S system will be distinguished from each other by indices P and S added at the ends of their reference numerals, respectively. The push rod 2 is coupled with the brake pedal (not illustrated) via a clevis 20. The brake pedal is an input member that receives the input of the driver's brake operation (a brake operation member). The push rod 2 operates in the x-axis direction according to a movement of the brake pedal. For example, the push rod 2 strokes toward the positive side in the x-axis direction according to the operation of pressing the brake pedal. An end of the push rod 2 on the positive side in the x-axis direction is in abutment with a piston 41P of the master cylinder 4 (refer to FIG. 9). The push rod 2 receives a driver's operation force input onto the brake pedal, and transmits this force to the master cylinder 4 as a thrust force in the x-axis direction. A flange portion 21 is provided on an outer periphery of a positive side of the push rod 2 in the x-axis direction. An abutment member 22, which has a convexly spherically shaped distal end on the positive side in the x-axis direction, is fixed to the end of the push rod 2 on the positive side in the x-axis direction. The brake apparatus 1 according to the present embodiment is not required to include a device (a master back) configured to operate with use of an intake pressure (a negative pressure) generated by the engine of the vehicle, which is disposed between the brake pedal and the master cylinder, as a boosting device (a brake booster) for reducing the brake operation force that the driver should input.

The reservoir tank 3 is a brake fluid source that stores brake fluid, and supplies the brake fluid to the master cylinder 4 and the actuator 8. The reservoir tank 3 includes a supply port 30, replenishment ports 31P and 31S, and replenishment ports 32*a* and 32*b*. The supply port 30 protrudes on a positive side of the reservoir tank 3 in the x-axis direction toward the positive side in the z-axis direction while being open outwardly, and is provided so as to be openable/closable by a cover 3*a*. The replenishment ports 31P and 31S are provided so as to be arranged side by side in the x-axis direction, and protrude on a negative side of the reservoir tank 3 in the z-axis direction while being open to the master cylinder 4 side. The replenishment port 31P is located on the negative side in the x-axis direction with respect to the replenishment port 31S. The replenishment ports 32*a* and 32*b* are located on the negative side in the x-axis direction with respect to the replenishment port 31P, and are open on surfaces of the reservoir tank 3 on both sides in the y-axis direction. A fastening portion 35 is provided on the negative side of the reservoir tank 3 in the z-axis direction and between the replenishment ports 31P and 31S. A hole, which receives insertion of a pin for attaching the reservoir tank 3 to the master cylinder 4, is formed at the fastening portion 35 so as to extend in the y-axis direction. Two partition plates 33*a* and 33*b* are disposed in the reservoir tank 3 so as to extend from a bottom surface on the negative side in the z-axis direction toward the positive side in the z-axis direction. The inside of the reservoir tank 3 is divided into three regions by the two partition plates 33*a* and 33*b*. The replenishment port 31S, the replenishment ports 32*a* and 32*b*, and the replenishment port 31P are located in the region on the positive side in the x-axis direction, the region on the negative side in the x-axis direction, and the region sandwiched by these two regions, respectively. The replenishment port 31S, the replenishment ports 32*a* and 32*b*, and the replenishment port 31P each include an opening portion. The partition plates 33 allow the brake fluid to be kept stored in each of the regions even when, for example, the vehicle tilts, speeds up, or slows down, and thus allow the brake fluid to be kept replenishable from each of the replenishment ports. A pipe attachment portion 320*a* is connected to the replenishment port 32*a* (refer to FIG. 1). One end of a brake pipe 71 is attached to the pipe attachment portion 320*a*. The pipe attachment portion 320*a* is provided so as to protrude from an outer surface of the reservoir tank 3 on the negative side in the x-axis direction, the positive side in the y-axis direction, and the negative side in the z-axis direction toward the positive side in the y-axis direction, and be bent at an intermediate position toward the positive side in the x-axis direction. A distal end of the pipe attachment portion 320*a*, to which the brake pipe 71 is attached, is open to the positive side in the x-axis direction. A pipe attachment portion 320*b* is connected to the replenishment port 32*b* (refer to FIG. 2). An end of another brake pipe is attached to the pipe attachment portion 320*b*. The pipe attachment portion 320*b* is provided so as to protrude from the outer surface of the reservoir tank 3 on the negative side in the x-axis direction, the negative side in the y-axis direction, and the negative side in the z-axis direction toward the negative side in the y-axis direction, and be bent at an intermediate position toward the positive side in the x-axis direction. A distal end of the pipe attachment portion 320*b*, to which the brake pipe is attached, is open to the positive side in the x-axis direction.

The master cylinder 4 is a first brake hydraulic generation source that generates the hydraulic pressure (the master cylinder hydraulic pressure) according to the operation performed by the driver on the brake pedal (the brake operation). The master cylinder 4 is connected to each of the wheel cylinders via a not-illustrated oil passage (a brake pipe). The master cylinder hydraulic pressure is supplied to each of the wheel cylinders via this oil passage, thereby generating the wheel cylinder hydraulic pressure (the brake hydraulic pressure). The master cylinder 4 includes a master cylinder housing (a cylinder) 40, the pistons 41, and coil springs 42. The master cylinder housing 40 includes a main body portion 40a, a flange portion 40b, and a fitting portion 40c. The main body portion 40a has one end side (the positive side in the x-axis direction) that is closed, and is formed into a bottomed cylindrical body extending in the x-axis direction. The flange portion 40b is provided on an outer periphery of a negative side of the main body portion 40a in the x-axis direction. Fastening portions 40d and 40e, which include bolt holes extending in the x-axis direction, are provided on both sides of the flange portion 40b in the y-axis direction. The fastening portions 40d and 40e are located at generally symmetrical positions with respect to an axial center of the main body portion 40a. The fitting portion 40c is adjacent to a negative side of the flange portion 40b in the x-axis direction, and has a generally cylindrical shape extending from the flange portion 40b in the x-axis direction. A seal member 402 is disposed in a seal groove 401 formed so as to extend throughout an outer circumference of the fitting portion 40c.

An axial hole 400, which extends in the x-axis direction, is formed inside the master cylinder 40. The hole 400 is open on a negative side of the master cylinder housing 40 in the x-axis direction. The master cylinder 4 is a so-called tandem-type cylinder, and two pistons 41P and 41S are disposed in the hole 400 so as to be operable (reciprocatable) in the x-axis direction. A concavely spherically shaped receiving portion 410 is formed on a negative side of the piston 41P of the P system in the x-axis direction. The convexly spherically shaped end of the push rod 2 (the abutment member 22) on the positive side in the x-axis direction is in abutment with the receiving portion 410. The push rod 2 is rotatably fitted to the receiving portion 410 in this manner. The piston 41S of the S system is a free piston, and is disposed on the positive side in the x-axis direction with respect to the piston 41P. Recessed portions 411P and 411S, which extend in the x-axis direction and are open to the positive side in the x-axis direction, are formed on the pistons 41P and 41S, respectively. Communication holes 412P and 412S, which establish communication between inner peripheral surfaces of the recessed portions 411P and 411S and outer peripheral surfaces of the pistons 41P and 41S, are provided at the pistons 41P and 41S, respectively, so as to extend radially.

Discharge ports 44P and 44S, and replenishment ports 45P and 45S are formed at the master cylinder housing 40. These discharge ports 44P and 44S and replenishment ports 45P and 45S are open on an inner peripheral surface of the hole 400. The discharge ports 44P and 44S extend in the y-axis direction to be open on a side surface of the master cylinder housing 40 on the negative side in the y-axis direction (refer to FIG. 2), and are connected to the actuator 8 (refer to FIG. 10) via brake pipes (not illustrated). Then, the discharge ports 44P and 44S are provided communicably with the wheel cylinders (not illustrated) via the actuator 8. There are provided two discharge ports 44P of the P system, and another discharge port 44P (refer to FIG. 1) than the above-described discharge port 44P extends in the y-axis direction to be open on a side surface of the master cylinder housing 40 on the positive side in the y-axis direction. This discharge port 44P open to the positive side in the y-axis direction is connected to the stroke simulator 5 via a brake pipe 70, and is provided communicably with the stroke simulator 5 (a primary chamber 54). The replenishment ports 45P and 45S extend in the z-axis direction, and are open on a top surface of the master cylinder housing 40 on the positive side in the z-axis direction, and are connected to the reservoir tank 3 to communicate therewith. The replenishment ports 31P and 31S of the reservoir tank 3 are fitted to recessed portions 48P and 48S (to which the replenishment ports 45P and 45S are open) of the top surface of the master cylinder housing 40 via seal members 34P and 34S, and are in communication with the replenishment ports 45P and 45S, respectively. In other words, the reservoir tank 3 is provided integrally with the master cylinder 4. The brake fluid is replenished from the reservoir tank 3 into the master cylinder 4 via the replenishment ports 31P and 31S and the replenishment ports 45P and 45S. A fastening portion 49 is provide at an end of the master cylinder housing 40 on the positive side in the z-axis direction and between the recessed portions 48P and 48S, as viewed from the y-axis direction. A hole, which receives insertion of the pin for attaching the reservoir tank 3, is formed at the fastening portion 49 so as to extend in the y-axis direction. The pin (not illustrated) is inserted in the fastening portion 49 and the fastening portion 35 of the reservoir tank 3, and the fastening portion 35 of the reservoir tank 3 is fastened to the fastening portion 49 of the master cylinder housing 40 via the pin, by which the reservoir tank 3 is fixed to the master cylinder housing 40.

Seal members 46P, 46S, 47P, and 47S cup-shaped in cross-section are fixedly disposed on the inner peripheral surface of the hole 400. The seal members 46P and 47P are disposed so as to sandwich the opening of the replenishment port 45P in the x-axis direction. The seal members 46S and 47S are disposed so as to sandwich the opening of the replenishment port 45S in the x-axis direction. Inner peripheral sides (lip portions) of the seal members 46P, 46S, 47P, and 47S are in abutment with the respective outer peripheral surfaces of the pistons 41P and 41S. The seal members 46P, 46S, 47P, and 47S unidirectionally regulate a flow of the brake fluid flowing through a space between the inner periphery of the hole 400 and the outer peripheries of the pistons 41P and 41S. The seal member 46P of the P system regulates a flow of the brake fluid flowing from the replenishment port 45P toward the negative side in the x-axis direction (out of the master cylinder 40). The seal member 46S of the S system allows only a flow of the brake fluid flowing from the replenishment port 45S toward the negative side in the x-axis direction. The seal members 47P and 47S allow only flows of the brake fluid flowing from the replenishment ports 45P and 45S toward the positive side in the x-axis direction, respectively.

A hydraulic chamber 43, which includes a hydraulic chamber 43P of the P system and a hydraulic chamber 43S of the S system, is defined inside the master cylinder housing 40 (the hole 400). The hydraulic chamber 43P of the P system is defined between the pistons 41P and 41S (a region sealed by the seal members 47P and 46S). The hydraulic chamber 43S of the S system is defined between the piston 41S and a bottom of the master cylinder housing 40 (a region sealed by the seal member 47S). Coil springs 42P and 42S, which serve as return springs for the pistons 41P and 41S, are installed in the hydraulic chambers 43P and 43S in a pressed and compressed state, respectively. The discharge ports 44P and 44S are open to the hydraulic chambers 43P and 43S, respectively. As illustrated in FIG. 9, when the brake pedal is not pressed (when the flange portion 21 of the push rod 2 is in abutment with a stopper portion 507 of a stroke simulator housing 50), the pistons 41P and 41S are located maximally on the negative side in the x-axis direction, and the respective communication holes 412P and 412S of the pistons 41P and 41S are located on the negative side in the x-axis direction with respect to the seal members 47P and 47S, respectively. Therefore, the replenishment ports 45P and 45S are in communication with the inner peripheral sides of the recessed portions 411P and 411S of the pistons 41P and 41S, i.e., the hydraulic chambers 43P and 43S via the communication holes 412P and 412S, respectively. The pistons 41P and 41S operate in the x-axis direction in the hole 400, by which the brake hydraulic pressure is generated. More specifically, upon the driver's brake operation, the thrust force of the push rod 2 toward the positive side in the x-axis direction is transmitted to the pistons 41P and 41S. When the pistons 41P and 41S stroke toward the positive side in the x-axis direction, respective volumes of the hydraulic chambers 43P and 43S are reduced. When the communication holes 412P and 412S are displaced to be located on the positive side in the x-axis direction with respect to the seal members 47P and 47S, respectively, the seal members 47P and 47S cut off the communication from the hydraulic chambers 43P and 43S to the replenishment ports 45P and 45S (the reservoir tank 3) via the communication holes 412P and 412S, which causes generation of the hydraulic pressures (the master cylinder hydraulic pressure) in the hydraulic chambers 43P and 43S according to the brake operation. In the hydraulic chambers 43P and 43S, generally equal hydraulic pressures are generated. The brake fluid (the master cylinder hydraulic pressure) is supplied from the hydraulic chambers 43P and 43S toward the actuator 8 (the wheel cylinders) via the discharge ports 44P and 44S.

The stroke simulator 5 is provided so as to allow the brake fluid transmitted out of the master cylinder 4 to flow into the stroke simulator 5, and is an operation reaction force generation source that generates a simulative reaction force against the operation of the brake pedal. The stroke simulator 5 is connected to the master cylinder 4 via an oil passage (the brake pipe 70), and is also connected to the reservoir tank 3 via an oil passage (the brake pipe 71). The stroke simulator 5 includes the stroke simulator housing 50, a reaction force piston 51, and a coil spring 52. The stroke simulator housing 50 includes a main body portion 50a, a connection portion 50b, and a flange portion 50c, which are provided integrally with one another.

The main body portion 50a has a stepped bottomed cylindrical shape, and includes a large-diameter cylindrical portion 50d, a small-diameter cylindrical portion 50e, and a flange portion 50f, which are provided integrally with one another. The small-diameter cylindrical portion 50e is provided on the positive side in the x-axis direction with respect to the large-diameter cylindrical portion 50d, generally concentrically with this cylindrical portion 50d. The flange portion 50f is provided on the positive side in the x-axis direction with respect to the small-diameter cylindrical portion 50e, generally concentrically with this cylindrical portion 50e. An air removal bleeder 57, which is used to remove air accumulated in the stroke simulator 5, is provided at the cylindrical portion 50e. The air removal bleeder 57 is provided so as to protrude from an outer peripheral surface of a portion of the cylindrical portion 50e on the positive side in the x-axis direction and the positive side in the z-axis direction toward the negative side in the y-axis direction. An outer diameter of the flange portion 50f (a main body that does not include fastening portions 50g and 50h, which will be described below) is larger than an outer diameter of the cylindrical portion 50e and smaller than an outer diameter of the cylindrical portion 50d. The fastening portion 50g, which includes a bolt hole extending in the x-axis direction, is provided at a portion of the flange portion 50f on the positive side in the y-axis direction and the negative side in the z-axis direction. The fastening portion 50h, which includes a bolt hole extending in the x-axis direction, is provided at a portion of the flange portion 50f on the negative side in the y-axis direction and the positive side in the z-axis direction. The fastening portions 50g and 50h are located at generally symmetric positions with respect to an axial center of the main body portion 50a. The stroke simulator 5 and the stroke simulator valve 6 are coupled with each other by insertion of bolts through the bolt hole of the fastening portion 50g and the bolt hole of the fastening portion 50h. A first axial hole 501, a second axial hole 502, a valve attachment hole 503, an oil passage 55, and the like are formed inside the main body portion 50a. The first axial hole 501 is formed so as to extend in the x-axis direction on an inner peripheral side of the large-diameter cylindrical portion 50d. The second axial hole 502 is smaller in diameter than the first axial hole 501. The second axial hole 502 is formed so as to extend in the x-axis direction continuously from the first axial hole 501 on an inner peripheral side of the small-diameter cylindrical portion 50e, and is open to a bottom of the cylindrical portion 50d on the positive side in the x-axis direction. An oil passage of the air removal bleeder 57 is open to an end of the second axial hole 502 on the positive side in the x-axis direction and the positive side in the z-axis direction. An one end side of the main body portion 50a (the end of the second axial hole 502 on the positive side in the x-axis direction) is closed, while another end side thereof (an end of the first axial hole 501 on the negative side in the x-axis direction) is open.

The vale attachment hole 503 is formed so as to extend in the x-axis direction on the inner peripheral sides of the flange portion 50f and the cylindrical portion 50e, and is open on a positive side of the flange portion 50f in the x-axis direction. The valve attachment hole 503 has a stepped shape with a diameter thereof reducing from the positive side to the negative side in the x-axis direction. An end of the valve attachment hole 503 on the negative side in the x-axis direction and the end of the second axial hole 502 on the positive side in the x-axis direction are connected with each other via the oil passage 55 extending in the x-axis direction. The axial holes 501 and 502, the valve attachment hole 503, and the oil passage 55 are formed generally coaxially with one another. A connection port 58, which is in communication with the first axial hole 501, is provided at a portion of the cylindrical portion 50d on the positive side in the z-axis direction and the positive side in the y-axis direction. A pipe attachment portion 580 is connected to the connection port 58. Another end of the brake pipe 71 is attached to the pipe attachment portion 580. The pipe attachment portion 580 is provided so as to protrude from an outer surface of the cylindrical portion 50d that is located slightly closer to the positive side in the x-axis direction, the positive side in the y-axis direction, and the positive side in the z-axis direction toward the positive side in the y-axis direction, and be bent at an intermediate position toward the positive side in the x-axis direction. A distal end of the pipe attachment portion 580, to which the brake pipe 71 is attached, is open to the positive side in the x-axis direction.

The brake pipe 71 is not configured as a steel pipe but is configured as a flexible pipe made of a material such as rubber. As illustrated in FIG. 5, the brake pipe 71 is laid so as to extend in a U-shaped manner as viewed from the positive side in the y-axis direction. The brake pipe 71 extends from the pipe attachment portion 320a of the reservoir tank 3 to the positive side in the x-axis direction. Then, after being bent toward the negative side in the z-axis direction so as to surround the discharge port 44P (which protrudes toward the positive side in the y-axis direction, and is open thereto) on an inner peripheral side thereof, the brake pipe 71 is folded back toward the negative side in the x-axis direction to be attached to the pipe attachment portion 580. The first axial hole 501 is connected to the replenishment port 32a of the reservoir tank 3 via the brake pipe 71, thereby being in communication with the reservoir tank 3. A connection port 59 is provided on a positive side of a boundary portion between the cylindrical portion 50e and the flange portion 50f in the y-axis direction. The connection port 59 is in communication with the valve attachment hole 503, and is also in communication with the master cylinder 4 (the hydraulic chamber 43P) by being connected to the discharge port 44P open on a positive side of the master cylinder 4 in the y-axis direction via the brake pipe 70. The brake pipe 70 is configured as a higher rigid pipe (for example, a steel pipe) smaller in diameter than the brake pipe 71. As illustrated in FIG. 7, the brake pipe 70 is laid so as to extend in a U-shaped manner as viewed from the positive side in the x-axis direction. The brake pipe 70 extends from the discharge port 44P open on the positive side of the master cylinder 4 in the y-axis direction toward the positive side in the y-axis direction and the negative side in the z-axis direction. Then, after being bent toward the negative side in the y-axis direction so as to surround the brake pipe 71 on an inner peripheral side thereof, the brake pipe 70 is connected to the connection port 59.

The connection portion 50b is provided on the positive side in the z-axis direction with respect to the main body portion 50a (the cylindrical portion 50d). The connection portion 50b has a bottomed cylindrical shape extending in the x-axis direction. Fastening portions 50i and 50j, which include bolt holes extending in the x-axis direction, are provided at both sides of the connection portion 50b in the y-axis direction. The connection portion 50b is provided in such a manner that an outer peripheral surface of the connection portion 50b (including the fastening portions 50i and 50j) has a shape and a dimension generally similar to an outer peripheral surface of the flange portion 40b (including the fastening portions 40d and 40e) of the master cylinder housing 40 as viewed from the x-axis direction. The pipe attachment portion 320a of the reservoir tank 3 is located on the negative side in the y-axis direction with respect to an end of the connection portion 50b (a fastening portion 50i) on the positive side in the y-axis direction (does not protrude toward the positive side in the y-axis direction beyond the fastening portion 50i). The pipe attachment portion 320b of the reservoir tank 3 is located on the positive side in the y-axis direction with respect to an end of the connection portion 50b (a fastening portion 50j) on the negative side in the y-axis direction (does not protrude toward the negative side in the y-axis direction beyond the fastening portion 50j). A distal end of the air removal bleeder 57 on the negative side in the y-axis direction is located on the positive side in the y-axis direction with respect to the end of the connection portion 50b (the fastening portion 50j) on the negative side in the y-axis direction (does not protrude toward the negative side in the y-axis direction beyond the fastening portion 50j).

As illustrated in FIG. 9, a first axial hole 504, a second axial hole 505, and a third axial hole 506 are formed inside the connection portion 50b. The first axial hole 504 has a generally cylindrical shape extending in the x-axis direction, and is open on a positive side of the connection portion 50b in the x-axis direction. The first axial hole 504 is formed so as to be slightly larger in diameter than the diameter of the fitting portion 40c of the master cylinder housing 40. The second axial hole 505 is formed so as to be smaller in diameter than the first axial hole 504, and extend continuously from the first axial hole 504 in the x-axis direction. The third axial hole 506 is formed so as to be smaller in diameter than the second axial hole 505, and extend continuously from the second axial hole 505 in the x-axis direction. The third axial hole 506 is open on a negative side of the stroke simulator housing 50 in the x-axis direction (a portion where a vehicle mounting surface 508 is provided). The axial holes 504 to 506 are formed generally coaxially with one another. The fastening portions 50i and 50j are located at generally symmetric positions with respect to an axial center of the holes 504 to 506. The stopper portion 507 is formed at a bottom of the connection portion 50b on the negative side in the x-axis direction so as to surround the third axial hole 506. A surface of the stopper portion 507 on the positive side in the x-axis direction is tapered generally in parallel with a surface of the flange portion 21 of the push rod 2 on the negative side in the x-axis direction, and is provided so as to be abuttable against the surface of the flange portion 21 on the negative side in the x-axis direction.

The flange portion 50c has a plate-like shape extending generally in parallel with a y-z plane on the negative side of the stroke simulator housing 50 in the x-axis direction. The flange portion 50c is a fixation flange for fixing the stroke simulator housing 50 to the vehicle. The flange portion 50c has a generally rectangular shape having a side extending in the y-axis direction and a side extending in the z-axis direction as viewed from the x-axis direction. Stud shafts (stud bolts as fixation pieces) 509 are fixed at four corners of this flange portion 50c, respectively, so as to protrude toward the negative side in the x-axis direction. The axial center of the main body portion 50a (the axial hole 501 and the like) and an axial center of the connection portion 50b (the axial hole 504 and the like) are located at generally central positions of the flange portion 50c in the y-axis direction. The axial center of the connection portion 50b is located at a generally central position of the flange portion 50c in the z-axis direction. The axial center of the main body portion 50a is located slightly below (toward the negative side in the z-axis direction) an end of the flange portion 50c on the negative side in the z-axis direction (refer to FIG. 7). The flange portion 50c is formed in such a manner that a width (a dimension in the y-axis direction) of the flange portion 50c is greater than a width (a dimension in the y-axis direction) of the main body portion 50a, greater than a width (a dimension in the y-axis direction) of the main body portion 40a of the master cylinder housing 40, and greater than a width (a dimension in the y-axis direction) of the reservoir tank 3. Further, the flange portion 50c is formed in such a manner that the width (the dimension in the y-axis direction) of the flange portion 50c generally matches a width (a dimension in the y-axis direction) of the connection portion 50b or the flange portion 40b of the master cylinder housing 40. More specifically, as illustrated in FIGS. 3 and 7, outer peripheral edges of the fastening portions 50i and 50*j* forming both end edges of the connection portion 50*b* in the y-axis direction, and outer peripheral edges of the fastening portions 40*d* and 40*e* forming both end edges of the flange portion 40*b* in the y-axis direction are generally in alignment with both end edges of the flange portion 50*c* in the y-axis direction (their positions in the y-axis direction are generally the same). On the other hand, as illustrated in FIG. 5, the flange portion 50*c* is formed in such a manner that a height (a dimension in the z-axis direction) of the flange portion 50*c* is greater than a height (a dimension in the z-axis direction) of the connection portion 50*b*, and a height (a dimension in the z-axis direction) of the master cylinder housing 40 (the flange portion 40*b*).

As illustrated in FIG. 9, the reaction force piston 51 is disposed in the second axial hole 502 of the main body portion 50*a* of the stroke simulator housing 50 so as to be operable in the x-axis direction. The reaction force piston 51 is disposed so as to protrude from an end of the second axial hole 502 on the negative side in the x-axis direction into the first axial hole 501. A spring retainer 512 is provided on an end of the reaction force piston 51, which protrudes into the first axial hole 501, on the negative side in the x-axis direction. The spring retainer 512 is provided integrally movably with the reaction force piston 51 in the first axial hole 501. A seal groove 510 is provided on an outer periphery of the reaction force piston 51, and a seal member 511 is installed in the seal groove 510. The seal member 511 is in abutment with an inner peripheral surface of the second axial hole 502. A plate-shaped spring retainer 53 is fixedly disposed at an opening of the first axial hole 501 on the negative side in the x-axis direction so as to close this opening. A seal member 532 is installed on an outer periphery of the spring retainer 53. The above-described opening of the first axial hole 501 is liquid-tightly sealingly closed by the abutment of the seal member 532 against an inner peripheral surface of the first axial hole 501. The primary chamber 54 and a secondary chamber 56 are defined by the reaction force piston 51 inside the stroke simulator housing 50. The primary chamber 54 is defined in the second axial hole 502 on the positive side in the x-axis direction with respect to the reaction force piston 51. The secondary chamber 56 is defined in the first axial hole 501 on the negative side in the x-axis direction with respect to the reaction force piston 51. The primary chamber 54 and the secondary chamber 56 are out of communication with each other due to the seal member 511. The oil passage 55 and the oil passage of the air removal bleeder 57 are constantly open to the primary chamber 54.

The coil spring 52, which serves as a return spring for the reaction force piston 51, is installed in the secondary chamber 56 in a pressed and compressed state. The coil spring 52 is an elastic member that constantly biases the reaction force piston 51 toward the primary chamber 54 side (in a direction for reducing a volume of the primary chamber 54 and increasing a volume of the secondary chamber 56). An end of the coil spring 52 on the positive side in the x-axis direction is held in abutment with an outer peripheral side of the spring retainer 512, and an end of the coil spring 52 on the negative side in the x-axis direction is held in abutment with the outer peripheral side of the spring retainer 53. A recessed portion 530, which is open to the positive side in the x-axis direction, is formed at a portion of the spring retainer 53 on an inner peripheral side with respect to the coil spring 52. An elastic member 531 is installed in the recessed portion 530. The elastic member 531 protrudes toward the positive side in the x-axis direction with respect to the spring retainer 53. The elastic member 531 is positioned relative to a portion of the spring retainer 512 on an inner peripheral side with respect to the coil spring 52, and is located opposite in the x-axis direction from the portion of the spring retainer 512 on the inner peripheral side. When the reaction force piston 51 (the spring retainer 512) is displaced toward the negative side in the x-axis direction by a larger displacement amount than a predetermined amount, the elastic member 531 is brought into abutment with the above-described portion of the spring retainer 512 on the inner peripheral side, thereby being elastically deformed. As a result, in addition to regulating the displacement of the reaction force piston 51 toward the negative side in the x-axis direction, the elastic member 531 also functions as a damper that absorbs an impact when regulating this displacement.

The brake apparatus 1 as the master cylinder unit is also a valve unit including the stroke simulator valve 6 built therein. The stroke simulator valve 6 is a simulator shutoff valve constantly closed (opened when no power is supplied) that is provided so as to be able to limit the flow of the brake fluid into the stroke simulator 5. The stroke simulator valve 6 is attached into the valve attachment hole 503 formed in the stroke simulator housing 50 (the main body portion 50*a*). A valve attachment surface is formed by a surface of the main body portion 50*a* (the flange portion 50*f*) on the positive side in the x-axis direction where the valve attachment hole 503 is open. The primary chamber 54 of the stroke simulator 5 is connected to the stroke simulator valve 6 via the oil passage 55. The stroke simulator valve 6 is connected to the hydraulic chamber 43P of the master cylinder 4 via an oil passage (the brake pipe 70).

As illustrated in FIG. 9, the stroke simulator valve 6 includes a solenoid 61, a valve body 62, an armature 63, a plunger 64, a coil spring 65, a valve seat member 66, and a plurality of oil passage formation members. The solenoid 61 is fastened to the flange portion 50*f* (the fastening portions 50*g* and 50*h*) at the end of the main body portion 50*a* of the stroke simulator housing 50 on the positive side in the x-axis direction by bolts. The armature 63 is fixedly installed on an inner peripheral side of the solenoid 61, and generates an electromagnetic force (a magnetic suction force) upon power supply to the solenoid 61. A connector portion 610, which is open to the positive side in the x-axis direction, is provided at an end of the solenoid 61 on the positive side in the x-axis direction. A wiring (a harness), which supplies a driving current to the solenoid 61, is connected to the connector portion 610. The valve body 62 is a non-magnetic hollow cylinder. The valve body 62 is fixedly installed so as to be fitted to an outer periphery of the armature 63, and extends toward a negative side of the armature 63 in the x-axis direction. The plunger 64 is contained in the valve body 62 so as to be reciprocatable in the x-axis direction. A spherical valve body 640 is provided at a distal end of the plunger 64 on the negative side in the x-axis direction. The valve body 640 operates in the x-axis direction. The coil spring 65 is installed between the armature 63 and the plunger 64 in a compressed state, and constantly biases the plunger 64 toward the negative side in the x-axis direction. The valve seat member 66 is disposed on an inner peripheral side of the valve attachment hole 503 of the main body portion 50*a*. The valve seat member 66 has a bottomed cylindrical shape, and a valve seat is provided at a bottom thereof on the positive side in the x-axis direction. An orifice 660, which extends in the x-axis direction, is formed through this bottom, and is open at a central portion of the valve seat. The plunger 64 is driven by the electromagnetic force (a suction force toward the positive side in the x-axis direction)

of the armature 63, and the valve body 640 opens/closes the orifice 660, which controls a communication state of an oil passage including the orifice 660 (a simulator oil passage, which will be described below).

The oil passage formation members include a first member 67 as a body, a second member 68 and a third member 69 as filters, and a seal member 60. The first member 67 is a hollow member fixed to the opening of the valve attachment hole 503 on the positive side in the x-axis direction by a flange. The valve seat member 66 is fixedly disposed on an inner peripheral side of the first member 67, and an oil passage is formed between the inner periphery of the first member 67 and an outer periphery of the valve seat member 66. The second member 68 is a ring-shaped filter member fixed to a negative side of the first member 67 in the x-axis direction. The valve seat member 66 is fixedly disposed on an inner peripheral side of the second member 68, and an oil passage is formed between the inner periphery of the second member 68 and the outer periphery of the valve seat member 66. The third member 69 is a disk-shaped filter member (a retainer of the seal member 60) disposed at a bottom of the valve attachment hole 503 on the negative side in the x-axis direction, and the valve seat member 66 is disposed on an inner peripheral side thereof. The seal member 60 is a seal member cup-shaped in cross-section that is similar to the seal members 46 and the like, and is disposed between the second member 68 and the third member 69. The valve seat member 66 is fixedly disposed on an inner peripheral side of the seal member 60. No oil passage is formed between the inner periphery of the seal member 60 and the outer periphery of the valve seat member 66. A lip portion on an outer peripheral side of the seal member 60 is in contact with the inner peripheral surface of the valve attachment hole 503 so as to be opened toward the positive side in the x-axis direction. A flow of the brake fluid between the seal member 60 (the lip portion) and the inner peripheral surface of the valve attachment hole 503 is regulated in such a manner that the brake fluid is only allowed to flow from the negative side to the positive side in the x-axis direction, and is prohibited from flowing in a reverse direction.

The connection port 59 is open between the second member 68 and the seal member 60 on the inner periphery of the valve attachment hole 503. The oil passage 55, which is in communication with the primary chamber 54 of the stroke simulator 5, is open at the bottom of the valve attachment hole 503 on the negative side in the x-axis direction. The connection port 59 is in communication with the orifice 660 via the oil passages between the outer periphery of the valve seat member 66 and the inner peripheries of the first and second members 67 and 68, and a recessed portion formed at an end of the first member 67 on the positive side in the x-axis direction. The orifice 660 is in communication with the oil passage 55 via an oil passage 661 formed on an inner peripheral side of the valve seat member 66. This path forms the simulator oil passage, the communication of which can be switched between establishment and cutoff by the stroke simulator valve 6 while connecting the hydraulic chamber 43P and the primary chamber 54 to each other.

In other words, the primary chamber 54 of the stroke simulator 5 is in communication with the hydraulic chamber 43P via the oil passage 55, the stroke simulator valve 6, and the brake pipe 70. The secondary chamber 56 of the stroke simulator 5 is connected to the reservoir tank 3 via the brake pipe 71. The secondary chamber 56 is in constant communication with the reservoir tank 3, and is open to a low pressure (an atmospheric pressure), thereby forming a back-pressure chamber of the stroke simulator 5. The secondary chamber 56 may be directly open to the lower pressure (the atmospheric pressure) without being connected to the reservoir tank 3. When the stroke simulator valve 6 is opened, the brake fluid transmitted out of the master cylinder 4 (the hydraulic chamber 43P) according to the driver's brake operation is delivered into the stroke simulator housing 50 (the primary chamber 54) via the simulator oil passage. This brake fluid causes the reaction force piston 51 to axially operate in the hole 502. As a result, the stroke simulator 5 generates a simulative reaction force against the operation on the brake pedal, and applies this force to the brake pedal. More specifically, the stroke simulator valve 6 is opened by receiving the power supply, and establishes the communication of the simulator oil passage. The master cylinder hydraulic pressure is applied to the primary chamber 54 of the stroke simulator 5 via the simulator oil passage. When a hydraulic pressure (the master cylinder hydraulic pressure) of a predetermined pressure or higher is applied to a pressure-receiving surface of the reaction force piston 51 in the primary chamber 54, this pressure causes the reaction force piston 51 to be displaced axially toward the secondary chamber 56 while pressing and compressing the coil spring 52. The volume of the primary chamber 54 increases, and the brake fluid is introduced from the master cylinder 5 (the hydraulic chamber 43P) into the primary chamber 54 via the simulator oil passage. Further, the brake fluid is discharged from the secondary chamber 56 into the reservoir tank 3 via the brake pipe 71.

In this manner, when the driver performs the brake operation (presses the brake pedal), the stroke simulator 5 creates a pedal stroke by taking in the brake fluid from the master cylinder 5 and simulates hydraulic rigidity of the wheel cylinders, thereby reproducing a feeling that the driver would have when pressing the brake pedal. At this time, while the coil spring 52 alone is pressed and compressed at an early stage of the pressing of the brake pedal, a spring constant is small, and the pedal reaction force increases at a low gradient. While the elastic member 531 is pressed and compressed in addition to the coil spring 52 at a late stage of the pressing of the brake pedal, the spring constant is high, and the pedal reaction force increases at a high gradient. These spring constants are adjusted in such a manner that the pedal pressing feeling is set so as to resemble, for example, the conventional master cylinder. When the driver completes the brake operation (releases the pressing to return the brake pedal), and the pressure in the primary chamber 54 reduces to lower than a predetermined pressure, the reaction force piston 51 is returned to an initial position due to the biasing force (an elastic force) of the coil spring 52.

The third member 69 may be provided with an oil passage that establishes communication between the inner periphery of the third member 69 and an end surface of the third member 69 on the positive side in the x-axis direction, and the oil passage 55 may be in communication with a negative side of the seal member 60 in the x-axis direction via this oil passage. In this case, the oil passage is arranged in parallel with the above-described simulator oil passage, which forms a bypass oil passage that regulates the flow direction by the seal member 60. The seal member 60 allows only a flow of the brake fluid in this bypass oil passage from the primary chamber 54 of the stroke simulator 5 toward the hydraulic chamber 43P of the master cylinder 4. The above-described bypass oil passage allows the brake fluid to be returned from the primary chamber 54 to the master cylinder 4 side via this bypass oil passage even when the stroke simulator valve 6 malfunctions to be kept closed (stuck in the closed state) with the brake fluid introduced into the primary chamber 54.

In the following description, a structure for mounting the brake apparatus 1 will be described. The master cylinder housing 40 is fixed to the stroke simulator housing 50. The housings 40 and 50 are fixed integrally with each other. The housings 40 and 50 have joint surfaces for fixing them integrally with each other. These joint surfaces include an outer peripheral surface of the fitting portion 40c of the master cylinder housing 40, an end surface of the flange portion 40b on the negative side in the x-axis direction, an inner peripheral surface of the first axial hole 504 of the connection portion 50b of the stroke simulator housing 50, and an end surface of the connection portion 50b on the positive side in the x-axis direction (where the first axial hole 504 is open). These joint surfaces include a socket-and-spigot portion (the outer peripheral surface of the fitting portion 40c and the inner peripheral surface of the first axial hole 504) that functions as a socket-and-spigot joint. In other words, the housings 40 and 50 are joined to each other by recessing a part of the stroke simulator housing 50 (the connection portion 50b), and fitting a protrusion of the master cylinder housing 40 therein. More specifically, the housings 40 and 50 are fitted to each other by inserting the fitting portion 40c of the master cylinder housing 40 into the first axial hole 504 of the stroke simulator housing 50. The end surface of the flange portion 40b of the master cylinder housing 40 on the negative side in the x-axis direction is brought into abutment with the end surface of the connection portion 50b on the positive side in the x-axis direction by sliding the housings 40 and 50 relative to each other in the x-axis direction. The master cylinder housing 40 and the stroke simulator housing 50 are fixedly fastened integrally with each other by insertion of bolts 10 into the fastening portions 40d and 40e of the master cylinder housing 40 (the flange portion 40b) and the fastening portions 50i and 50j of the stroke simulator housing 50 (the connection portion 50b) to establish fastened engagement between the fastening portions 40d and 40e and the fastening portions 50i and 50j. The seal member 402 installed in the fitting portion 40c is in abutment with the inner peripheral surface of the first axial hole 504, by which the above-described opening of the first axial hole 504 is liquid-tightly sealingly closed. The master cylinder housing 40 includes, on an inner peripheral side of this fitting portion 40c, a portion protruding toward the negative side in the x-axis direction beyond the fitting portion 40c. The portion of the master cylinder housing 40 that protrudes toward the negative side in the x-axis direction beyond the fitting portion 40c is contained in the first axial hole 504. The piston 41P, which protrudes from the hole 400 of the master cylinder housing 40 toward the negative side in the x-axis direction, is contained in the second axial hole 505.

On the other hand, the brake apparatus 1 includes the vehicle mounting surface 508 for mounting the stroke simulator housing 50 (the brake apparatus 1) onto the vehicle. The vehicle mounting surface 508 includes a surface of the stroke simulator housing 50 on the negative side in the x-axis direction. The surface of the stroke simulator housing 50 on the negative side in the x-axis direction includes a surface of the flange portion 50c on the negative side in the x-axis direction. The stroke simulator housing 50 is fixedly fastened by the stud shafts 509 to a positive side of a lower portion (a ground-side portion) of a not-illustrated dashboard (a floor panel) of the vehicle body in the x-axis direction. The dashboard is a partition member on the vehicle body side that separates an engine room (or a motor room where a power unit, such as a motor that enables the vehicle to run, is mounted; hereinafter simply referred to as the engine room) and a passenger room from each other. The stroke simulator housing 50 is fixed to the dashboard by the four fixation points with a slight space formed in the x-axis direction between the flange portion 50c and the dashboard due to a spacer (not illustrated) threadably engaged with or inserted in the stud shafts 509. A size (a thickness in the x-axis direction, the width in the y-axis direction, and the height in the z-axis direction) of the flange portion 50c is set so as to allow the brake apparatus 1 to be mounted on the vehicle with a sufficient strength while being kept from becoming unnecessarily large.

The master cylinder housing 40 is fixed to the stroke simulator housing 50 as described above, and this means that the master cylinder housing 40 is fixed to the vehicle via the stroke simulator housing 50. When the brake apparatus 1 is fixed to the dashboard, a negative side of the push rod 2 in the x-axis direction extends through the dashboard to protrude into the passenger room (toward the negative side in the x-axis direction). The master cylinder 4, the reservoir tank 3, the stroke simulator 5, and the like are mounted on the front side of the vehicle (the positive side in the x-axis direction) in the engine room. A part of the stopper portion 507 of the stroke simulator housing 50 protrudes toward the negative side in the x-axis direction beyond the vehicle mounting surface 508, thereby forming an engagement portion. A boot 2a is attached to this engagement portion to cover the push rod 2. As described above, the stroke simulator housing 50 can be fixed to the dashboard due to the stud shafts 509 rigidly (without an elastic member provided therebetween). Therefore, an excellent reaction force can be generated against the driver's brake operation force (the pressing force) input onto the brake pedal (the push rod 2), and at the same time, the brake operation force can be appropriately transmitted to the pistons 41 of the master cylinder 4, whereby the master cylinder hydraulic pressure can be generated according to the brake operation force. However, the stroke simulator housing 50 may be fixed to the dashboard via an elastic member.

Next, a layout of the brake apparatus 1 will be described. If being viewed from the z-axis direction, the master cylinder 4 and the stroke simulator 5 are arranged so as to be located one above another when the brake apparatus 1 is mounted on the vehicle. In other words, the master cylinder 4 and the stroke simulator 5 are integrally arranged so as to overlap each other as viewed from the vertical direction when the brake apparatus 1 is mounted on the vehicle. The reservoir tank 3, the master cylinder 4, and the stroke simulator 5 are arranged so as to be located in an order of the reservoir tank 3, the master cylinder 4, and the stroke simulator 5 from the top when the brake apparatus 1 is mounted on the vehicle. In other words, the reservoir tank 3 is disposed above the master cylinder 4, and the stroke simulator 5 is disposed below the master cylinder 4. Further, the master cylinder 4 and the stroke simulator 5 are disposed in parallel with each other. In other words, the master cylinder 4 and the stroke simulator 5 are arranged in such a manner that an axial direction of the master cylinder 4 and an axial direction of the stroke simulator 5 generally match each other. As a result, the master cylinder 4 and the stroke simulator 5 are located one above another with their axial directions matching each other when the brake apparatus 1 is mounted on the vehicle.

As illustrated in FIG. 7, the reservoir tank 3, the master cylinder 4, and the stroke simulator 5 are arranged in such a manner that a center of the reservoir tank 3 in the y-axis direction, the axis of the master cylinder 4, and the axis of the stroke simulator 5 are in alignment with one another along a generally same straight line extending in parallel with the z axis, as viewed from the x-axis direction, when the brake apparatus 1 is mounted on the vehicle. Therefore, the reservoir tank 3, the master cylinder 4, and the stroke simulator 5 overlap one another over a maximum range as viewed from the vertical direction when the brake apparatus 1 is mounted on the vehicle. Accordingly, the reservoir tank 3, the master cylinder 4, and the stroke simulator 5 define a minimized area when being projected vertically. As illustrated in FIGS. 3 and 4, the master cylinder 4 (the main body portion 40*a* of the master cylinder housing 40) and the stroke simulator 5 (the main body portion 50*a* of the stroke simulator housing 50) are provided so as to be contained in the width (the dimension in the y-axis direction) of the reservoir tank 3. Further, as illustrated in FIG. 5, the brake pipes 70 and 71 are laid so as to be contained in a height (a dimension in the z-axis direction) of the reservoir tank 3, the master cylinder housing 40, and the stroke simulator housing 50 as a whole. For example, the brake pipe 71 does not protrude toward the positive side in the z-axis direction beyond the reservoir tank 3. The brake pipe 70 does not protrude toward the negative side in the z-axis direction beyond the stroke simulator housing 50.

If being viewed from the y-axis direction, each of the members and structures of the brake apparatus 1 is provided so as to be contained in a width of the flange portion 50*c* of the stroke simulator housing 50. For example, as illustrated in FIGS. 3 and 4, the master cylinder 4 (the flange portion 40*b* including the fastening portions 40*d* and 40*e*, and the like of the master cylinder housing 40) and the stroke simulator 5 (the connection portion 50*b* including the fastening portions 50*i* and 50*j*, and the like of the stroke simulator housing 50) are configured to be contained in the width (the dimension in the y-axis direction) of the flange portion 50*c*. Further, as illustrated in FIGS. 3 and 7, the brake pipe 71 is laid so as to be contained in the width (the dimension in the y-axis direction) of the flange portion 50*c*. In other words, the brake pipe 71 is laid generally in parallel with an x-z plane, and the brake pipe 71 (an end thereof on the positive side in the y-axis direction) is located on the negative side in the y-axis direction with respect to the edge of the end of the flange portion 50*c* on the positive side in the y-axis direction (does not protrude toward the positive side in the y-axis direction beyond the flange portion 50*c*).

The stroke simulator valve 6 is located on a position in the axial direction of the stroke simulator 5. In other words, as illustrated in FIG. 7, the stroke simulator valve 6 is disposed on one side of the stroke simulator 5 in the axial direction (the positive side in the x-axis direction) in such a manner that the stroke simulator valve 6 and the stroke simulator 5 overlap each other as viewed from the axial direction of the stroke simulator 5 (the x-axis direction). Further, the stroke simulator valve 6 is arranged in such a manner that a direction in which the valve body 640 (the plunger 64) of the stroke simulator valve 6 operates generally matches a direction in which the reaction force piston 51 of the stroke simulator 5 operates. More specifically, the stroke simulator valve 6 is disposed generally concentrically with the stroke simulator 5. The stroke simulator valve 6 is arranged in such a manner that a central axis of the stroke simulator valve 6 (the valve attachment hole 503) extends along a generally same straight line as the central axis of the stroke simulator 5 (the axial holes 501 and 502). Therefore, the stroke simulator 5 and the stroke simulator valve 6 axially overlap each other over a maximum range. Accordingly, the stroke simulator 5 and the stroke simulator valve 6 define a minimum area when being projected in the x-axis direction. As illustrated in FIG. 7, the stroke simulator valve 6 (the flange portion 50*f* including the fastening portions 50*g* and 50*h* of the stroke simulator housing 50, the solenoid 61, and the like) is provided so as to be contained in the width (the dimension in the y-axis direction) and the height (the dimension in the z-axis direction) of the stroke simulator 5 (the main body portion 50*a* of the stroke simulator housing 50).

The stroke simulator valve 6 is disposed below the master cylinder 4 so as to overlap the master cylinder 4 as viewed from the vertical direction when the brake apparatus 1 is mounted on the vehicle. Further, the master cylinder 4 and the stroke simulator valve 6 are disposed in parallel with each other (in such a manner that their axial directions generally match each other). As a result, the master cylinder 4 and the stroke simulator valve 6 are located one above another with their axial directions matching each other. The master cylinder 4 and the stroke simulator valve 6 are arranged in such a manner that the axis of the master cylinder 4 and the axis of the stroke simulator valve 6 are in alignment with each other along a generally same straight line extending in parallel with the z axis as viewed from the x-axis direction when the brake apparatus 1 is mounted on the vehicle. Therefore, the master cylinder 4 and the stroke simulator valve 6 overlap each other over a maximum range as viewed from the vertical direction. As illustrated in FIGS. 4 and 7, the stroke simulator valve 6 (the flange portion 50*f* including the fastening portions 50*g* and 50*h* of the stroke simulator housing 50, the solenoid 60, and the like) is provided so as to be contained in the width (the dimension in the y-axis direction) of the master cylinder 4 (the main body portion 40*a* of the master cylinder housing 40).

As illustrated in FIGS. 3 and 4, an end of the stroke simulator 5 on the negative side in the x-axis direction, in particular, the end of the main body portion 50*a* of the stroke simulator housing 50 on the negative side in the x-axis direction extends to the flange portion 50*c*, if being viewed from the x-axis direction. An end of the stroke simulator valve 6 on the positive side in the x-axis direction, in particular, the end of the solenoid 61 on the positive side in the x-axis direction with the exception of the connector portion 610 is located on the negative side in the x-axis direction with respect to an end surface of the master cylinder housing 40 on the positive side in the x-axis direction (does not protrude toward the positive side in the x-axis direction beyond the master cylinder housing 40). As illustrated in FIGS. 3 to 6, an end of the reservoir tank 3 on the positive side in the x-axis direction, an end of the master cylinder 4 on the positive side in the x-axis direction, and the end of the stroke simulator valve 6 (the connector portion 610) on the positive side in the x-axis direction are located at generally same positions as one another in the x-axis direction. As illustrated in FIGS. 4 and 5, the brake pipe 71 is provided so as to be contained in the length (the dimension in the x-axis direction) of the master cylinder housing 40 and the stroke simulator housing 50. For example, the brake pipe 71 (the end thereof on the positive side in the x-axis direction) is located on the negative side in the x-axis direction with respect to the end surface of the master cylinder housing 40 on the positive side in the x-axis direction (does not protrude toward the positive side in the x-axis direction beyond the master cylinder housing 40).

As illustrated in FIG. 8, when the brake apparatus 1 is viewed from the negative side in the x-axis direction, the master cylinder 4, the stroke simulator 5, and the brake pipe

71 (a large part thereof on the negative side in the z-axis direction) are invisible because they are hidden by the flange portion 50c. As illustrated in FIG. 3, when the brake apparatus 1 is viewed from the positive side in the z-axis direction, the master cylinder 4 (except for a part of the flange portion 40b of the master cylinder housing 40), and the stroke simulator 5 (except for a part of the connection portion 50b, the flange portion 50c, and the like of the stroke simulator housing 50) are invisible because they are hidden by the reservoir tank 3. Further, as illustrated in FIG. 6, when the brake apparatus 1 is viewed from the negative side in the y-axis direction, the brake pipes 70 and 71 are invisible because they are hidden by the reservoir tank 3, the master cylinder 4, and the stroke simulator 5 (except for a part of the brake pipe 71 on the negative side in the z-axis direction and a part of the brake pipe 70 that are visible through a gap between the master cylinder housing 40 and the stroke simulator housing 50).

Figure 10:
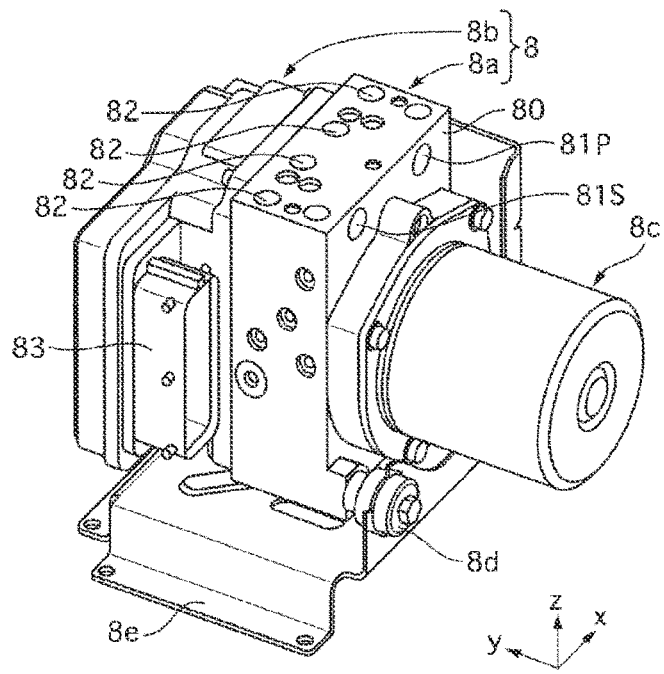
FIG. 10 is a perspective view of an actuator 8 according to the first embodiment.
Figure 11:
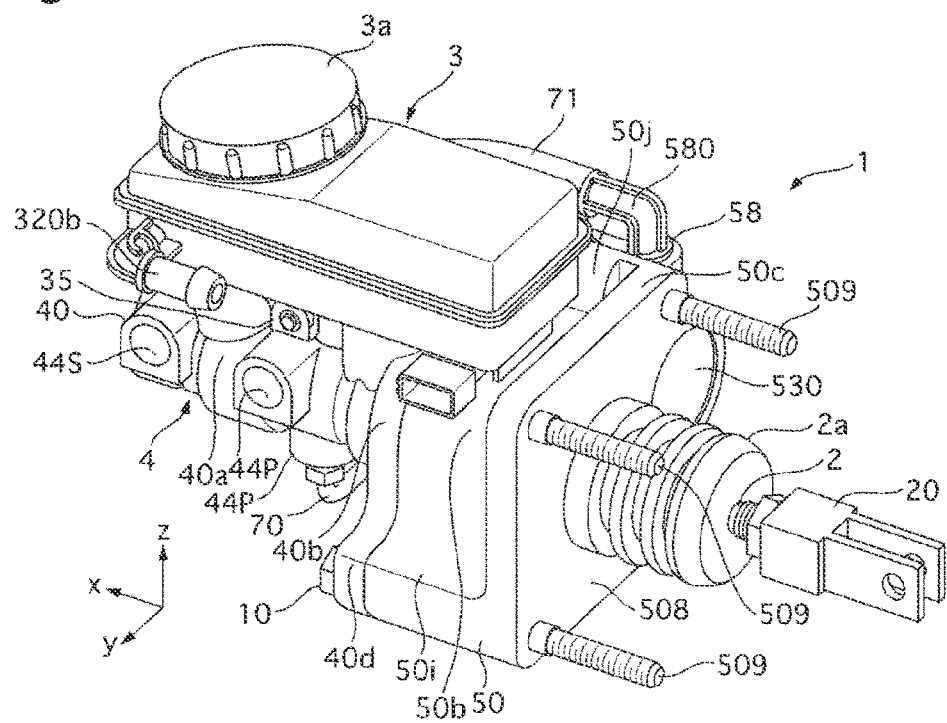
FIG. 11 is a perspective view of a brake apparatus 1 according to a second embodiment.
Figure 12:
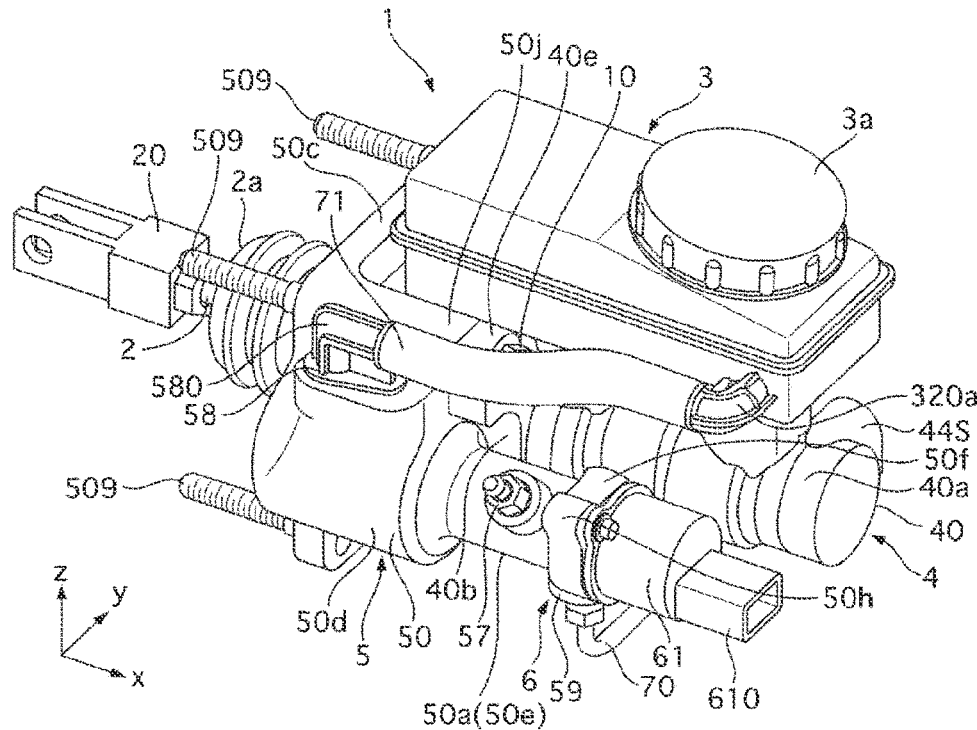
FIG. 12 is a perspective view of the brake apparatus 1 according to the second embodiment.

Next, the actuator 8 will be described. FIG. 10 is a perspective view of the actuator 8 as viewed from the negative side in the x-axis direction, the negative side in the y-axis direction, and the positive side in the z-axis direction. The actuator 8 is a second brake hydraulic generation source capable of generating the brake hydraulic pressure independently of the driver's brake operation by receiving the brake fluid from the master cylinder 4 and the reservoir tank 3. The actuator 8 is disposed between the wheel cylinder of each of the wheels and the master cylinder 4, and is a hydraulic control unit capable of individually supplying the master cylinder hydraulic pressure or the controlled hydraulic pressure generated by the actuator 8 itself to each of the wheel cylinders. The actuator 8 includes a hydraulic unit 8a, and a controller (an electric control unit, ECU) 8b that controls an operation of the hydraulic unit 8a. The hydraulic unit 8a and the controller 8b are configured as an integrally prepared unit.

The hydraulic unit 8a includes a pump, which is a hydraulic generation source, and a plurality of control valves (electromagnetic valves) that switch a communication state of an oil passage formed in a housing 80, as hydraulic devices for generating the controlled hydraulic pressure. A motor 8c, which drives the pump, is integrally attached to the hydraulic unit 8a (the housing 80). A specific configuration of a hydraulic circuit of the hydraulic unit 8a is similar to a known hydraulic unit, and therefore will not be described herein. The hydraulic unit 8a is provided with a hydraulic sensor that detects a hydraulic pressure (the master cylinder hydraulic pressure or the like) at a predetermined portion in the oil passage, and a value detected thereby is input into the controller 8b. The controller 8b is configured to be able to control the hydraulic pressure in each of the wheel cylinders independently of the driver's brake operation by controlling an operation of each device of the hydraulic unit 8a based on input various kinds of information.

The hydraulic unit 8a is connected to the brake apparatus 1 via the brake pipes. The hydraulic unit 8a is disposed, for example, below the brake apparatus 1, in such a manner that the directions such as the x axis illustrated in FIG. 10 matches the directions such as the x axis illustrated in FIG. 1, respectively. This arrangement can reduce an area defined by projecting the entire brake system in the vertical direction (the top-down direction of the vehicle), thereby improving the mountability onto the vehicle. The housing 80 of the hydraulic unit 8a is fixedly attached to the vehicle body side (the floor of the engine room) via a damper 8d and a bracket 8e. Master cylinder ports 81 of the P system and the S system, and four wheel cylinder ports 82 are provided on a top side of the housing 80 as openings of the oil passage formed in the housing 80. The master cylinder port 81P of the P system is connected to the discharge port 44P (on the negative side in the y-axis direction) of the master cylinder 4 for the P system via the brake pipe, thereby being in communication with the hydraulic chamber 43P. The master cylinder port 81S of the S system is connected to the discharge port 44S of the master cylinder 4 for the S system via the other brake pipe, thereby being in communication with the hydraulic chamber 43S. Each of the wheel cylinder ports 82 is connected to each of the wheel cylinders via a brake pipe. Further, another port of the housing 80 is connected to the replenishment port 32b of the reservoir tank 3 via a brake pipe, thereby being in communication with the reservoir tank 3.

The controller 8b is configured as a separate member from the master cylinder 4, i.e., a separate member from the brake apparatus 1 (the master cylinder unit including the stroke simulator valve 6). The controller 8b is provided with a connector 83, to which the harness is connected. The stroke simulator valve 6 and the controller 8b are connected to each other via the harness. Data input into the controller 8b includes a detection value transmitted from a pedal stroke sensor that detects an operation amount of the brake pedal, a detection value transmitted from the hydraulic sensor that detects a discharge pressure of the pump and the master cylinder hydraulic pressure, and information regarding a running state transmitted from the vehicle. The controller 8b controls opening/closing of each of the electromagnetic valves of the hydraulic unit 8a, and the number of rotations of the motor (a discharge amount of the pump) according to a built-in program based on these detection values and information. The controller 8b controls the wheel cylinder hydraulic pressure by this control, thereby realizing boosting control for reducing the required brake operation force, anti-lock brake control (ABS) for preventing the wheel from slipping (making the wheel less prone to be locked) due to the braking, brake control for stabilizing a behavior of the vehicle by, for example, preventing the wheel from skidding (vehicle stabilization control such as VDC and ESC), automatic brake control such as preceding vehicle following control, regenerative brake control for achieving a target deceleration (a target brake force) in cooperation with regenerative braking, and the like. For example, in the boosting control, the controller 8b adds an assist hydraulic pressure generated by driving the hydraulic unit 8a (with use of the discharge pressure of the pump) to the master cylinder hydraulic pressure generated according to the brake operation, thereby creating the wheel cylinder hydraulic pressure higher than the master cylinder hydraulic pressure.

When the hydraulic unit 8a is out of operation, the hydraulic chamber 43 of the master cylinder 4 and the wheel cylinder of each of the wheels are in communication with each other. At this time, the wheel cylinder hydraulic pressure is generated by the master cylinder hydraulic pressure generated with use of the force that the driver exerts on the brake pedal (the pressing force) (braking by the pressing force). The brake fluid is supplied from the hydraulic chamber 43 of the master cylinder 4 for each of the systems toward each of the wheel cylinders (via the oil passage in the hydraulic unit 8a) according to the operation of pressing the brake pedal (at the time of an increase in the pressure). In other words, the master cylinder hydraulic pressure generated according to the operation of pressing the brake pedal is supplied to each of the wheel cylinders without any adjustment made thereto. Further, when the driver releases the pressing to return the brake pedal, the brake fluid is returned from each of the wheel cylinders toward the master cylinder 4 (via the oil passage in the hydraulic unit 8$a$) (at the time of a reduction in the pressure). At this time, no power is supplied to the stroke simulator valve 6 provided in the simulator oil passage, so that the stroke simulator valve 6 is closed. Accordingly, the communication is cut off between the master cylinder 4 (the hydraulic chamber 43P) and the stroke simulator 5 (the primary chamber 54).

On the other hand, when the hydraulic unit 8$a$ is in operation, the wheel cylinder hydraulic pressure can be created by the hydraulic pressure generated with use of the pump while the communication is cut off between the hydraulic chamber 43 of the master cylinder 4 and each of the wheel cylinders. This configuration can form a so-called brake-by-wire system, and realize the boosting control, the regenerative cooperative brake control, and the like. At this time, power is supplied to the stroke simulator valve 6, so that the stroke simulator valve 6 is opened. Therefore, the communication is established between the master cylinder 4 (the hydraulic chamber 43P) and the stroke simulator 5 (the primary chamber 54). When the driver performs the brake operation (presses the brake pedal or releases the pressing to return the brake pedal), the stroke simulator 5 takes in and discharges the brake fluid introduced from the master cylinder 4, thereby creating the pedal stroke. The controller 8$b$ controls the operation of the stroke simulator valve 6 (the power supply state). That is, the controller 8$b$ is an integration of a hydraulic controller for controlling the wheel cylinder pressure and a controller for controlling the stroke simulator valve 6. In other words, the former hydraulic controller includes the latter controller.

<Functions of First Embodiment>

Next, functions will be described. In the brake system according to the present embodiment, the brake apparatus 1 and the actuator 8 are prepared as separate (individually independent) members. Therefore, each of the devices (the brake apparatus 1 and the actuator 8) is applicable to a wide range of vehicles, and the brake system can be easily used even for different types of vehicles. Further, the size of the brake apparatus 1 can be reduced compared to the brake apparatus 1 prepared integrally with the actuator 8. Generally, the brake apparatus as the input apparatus, into which the brake operation is input, should be mounted in a limited space in the vehicle, but the reduction in the size of the brake apparatus 1 allows the layout of the brake apparatus 1 to be more freely designed.

In the brake system according to the present embodiment, the actuator 8 is provided so as to be able to perform the boosting control, in which the actuator 8 generates the higher wheel cylinder hydraulic pressure than the master cylinder hydraulic pressure, thereby reducing the required brake operation force. In other words, the actuator 8, which serves as the wheel cylinder hydraulic pressure controller prepared as a separate member from the brake apparatus 1, can be caused to also function as a booster. Therefore, the brake system can omit a conventional booster, such as the master back that boosts the brake operation force with use of the intake pressure (the negative pressure) generated by the engine of the vehicle. Further, the brake apparatus 1 as the input apparatus does not have to be provided with a booster that boosts the brake operation force with use of a pressure accumulation unit (an accumulator), an electric motor, or the like. Therefore, the entire brake system can be simplified, thereby achieving high vehicle applicability. Further, the size of the brake apparatus 1 can be reduced, which contributes to saving the space in the vehicle. For example, the brake apparatus 1 can be mounted in a space that otherwise would have been required to mount the master back. The brake apparatus 1 may include the above-described negative pressure booster, a link-type booster using a link mechanism, or the electric (hydraulic) booster using the electric motor or the like, instead of causing the actuator 8 to function as the booster. Further, the brake apparatus 1 (the brake system) according to the present embodiment is preferably usable for the vehicle capable of generating the regenerative brake force, but is also usable for another type of vehicle (a non-electric vehicle using only the engine as the driving source).

In the brake apparatus 1, the reservoir tank 3, the master cylinder 4, and the stroke simulator 5 are provided integrally with one another (as members forming the single master cylinder unit). This integration can reduce the lengths of the oil passages that connect the reservoir tank 3, the master cylinder 4, and the stroke simulator 5 with one another. Further, this integration can reduce the size of the brake apparatus 1 as the input apparatus including the reservoir tank 3, the master cylinder 4, and the stroke simulator 5. The reduction in the size of the brake apparatus 1 facilitates the mounting of the brake apparatus 1 onto different types of vehicles, making the brake apparatus 1 highly applicable to the wide range of vehicles. This high applicability can lead to a reduction in manufacturing cost.

Generally, the master cylinder comes in various types according to the rank of the vehicle on which the master cylinder will be mounted. If the master cylinder and the stroke simulator are formed with use of a shared housing, this shared housing should be designed and manufactured for each of the various types of master cylinders. Therefore, in this case, the brake apparatus may have low compatibility with different types of vehicles (different ranks of vehicles), which may make it difficult to divert the brake apparatus for use for another type of vehicle, and thus prevent the brake apparatus from being applicable to the wide range of vehicles. On the other hand, in the brake apparatus 1, the master cylinder housing 40 is fixed to the stroke simulator housing 50. In other words, before the brake apparatus 1 is assembled, the master cylinder 4 and the stroke simulator 5 are prepared as separate members (include their respective individual housings 40 and 50), and are prepared in a state individually independent of each other. The brake apparatus 1 is completed by integrally fixing the housings 40 and 50 to each other at the time of the assembling. This configuration can eliminate the necessity of preparing the housing of the entire brake apparatus 1 for each variation of the master cylinder 4. Therefore, the brake apparatus 1 can be constructed with use of the existing master cylinder 4, thereby achieving high applicability to the wide range of different types (ranks) of vehicles. In other words, the master cylinder 4 and the stroke simulator 5 are individually configured as modules, which allows the individual models 4 and 5 to be arbitrarily combined with each other according to the type (the rank) of the vehicle on which they will be mounted. This flexibility facilitates utilization of an existing product for the brake apparatus. More specifically, the brake apparatus 1 fit to the vehicle can be acquired by appropriately combining the existing master cylinder 4 (the master cylinder housing 40) according to the rank of the vehicle on which the brake apparatus 1 will be mounted to the predetermined stroke simulator 5 (the stroke simulator housing 50).

The master cylinder housing 40 and the stroke simulator housing 50 are joined together (the socket-and-spigot joint) by the joint surfaces (the outer peripheral surface of the fitting portion 40c and the like) including the socket-and-spigot portion, and are fixed integrally with each other. This configuration further facilitates utilization of the existing (widely applicable) master cylinder for the brake apparatus 1. For example, the existing master cylinder 4 can be used without any modification made thereto by providing the stroke simulator housing 50 with a recessed shape (the first axial hole 504 in the present embodiment) that allows some protrusion originally formed on the housing of the existing master cylinder (the fitting portion 40c on the negative side in the x-axis direction in the present embodiment) to be fitted therein, and joining them together by the socket-and-spigot joint.

The stroke simulator housing 50 includes the vehicle mounting surface 508, and is mounted onto the vehicle via the vehicle mounting surface 508. Therefore, the master cylinder 4 and the stroke simulator 5 can be easily mounted onto the vehicle via the stoke simulator housing 50. However, the present embodiment may be configured in such a manner that the master cylinder 40 is mounted onto the vehicle, instead of the stroke simulator housing 50 mounted onto the vehicle. However, in this case, an attempt to fix the stroke simulator housing 50 to the master cylinder housing 40 mounted on the vehicle without changing the shape of the existing master cylinder housing 40 as much as possible (for improving the applicability to the wide range of vehicles) results in limited availability of an appropriate portion of the master cylinder housing 40 which the stroke simulator housing 50 can be joined to. In other words, it is comparatively uneasy to mount the stroke simulator 5 onto the vehicle via the master cylinder housing 40 (mounted on the vehicle) while improving the applicability of the master cylinder 4 to the wide range of vehicles. On the other hand, restrictions on the change in the shape are fewer for the stroke simulator housing 50 than the master cylinder housing 40. Therefore, the present embodiment is configured in such a manner that the stroke simulator housing 50 is mounted onto the vehicle and the master cylinder 4 is mounted onto the vehicle via the stroke simulator housing 50, and the configuration like the present embodiment allows the shape of the stroke simulator housing 50 to be relatively freely designed, and thus a portion where the master cylinder housing 40 can be joined to be relatively easily obtained. In other words, the present embodiment allows the master cylinder 4 and the stroke simulator 5 to be easily mounted onto the vehicle while improving the applicability of the master cylinder 4 to the wide range of vehicles. Further, the present embodiment is configured in such a manner that the stroke simulator housing 50 is attached to the vehicle, thereby also succeeding in improving applicability of the stroke simulator housing 50 to a wide range of vehicles compared to attaching the master cylinder housing 40 to the vehicle. More specifically, attaching the stroke simulator housing 50 to the vehicle allows a vehicle mounting portion (the fitting portion 40c in the present embodiment) originally prepared at the existing master housing to be selected as the joint portion of the master cylinder housing 40 for joining the master cylinder housing 40 to the stroke simulator housing 50. This vehicle mounting portion (the fitting portion 40c) has been standardized to some degree. Providing the stroke simulator housing 50 with a recessed shape according to this standardized vehicle mounting portion (the fitting portion 40c) allows this stroke simulator housing 50 to be used as the stroke simulator housing 50 applicable to the wide range of vehicles. In other words, the stroke simulator housing 50 is made applicable to the wide range of vehicles as described above, which allows the stoke simulator housing 50 to be combined with an arbitrary master cylinder housing 40, thereby facilitating diversion of the stroke simulator 5 for use for another type of vehicle.

It is preferable to provide the brake pipes 70 and 71 forming the oil passages that connect the master cylinder 4 and the stroke simulator 5 to each other, according to preparing the master cylinder 4 (the master cylinder housing 40) and the stroke simulator 5 (the stroke simulator housing 50) as separate members before the assembling. In the present embodiment, the pipe attachment portion 320a of the reservoir tank 3 and the connection port 58 of the stroke simulator 5 are provided on the same side surface of the brake apparatus 1 (on the positive side in the y-axis direction), which contributes to reducing the length of the brake pipe 71, and improving workability of connecting the brake pipe 71 and manageability of the brake pipe 71. The same applies to the brake pipe 70. Further, at least the brake pipe 71 of the brake pipes 70 and 71, to which no high pressure is applied, is made of the flexible material (the material such as rubber). This selection can improve layout flexibility and the manageability of the brake pipe 71, compared to the brake pipe 71 made of a steel pipe.

The master cylinder 4 and the stroke simulator 5 are arranged in such a manner that the master cylinder 4 and the stroke simulator 5 overlap each other (are located one above another) as viewed from the vertical direction when the brake apparatus 1 is mounted on the vehicle. This arrangement can lead to the reduction in the area defined by projecting the brake apparatus 1 from above. As a result, the present embodiment can reduce a region occupied by the brake apparatus (an occupied area) in the engine room as viewed from above, thereby succeeding in improving the mountability of the brake apparatus 1 onto the vehicle (layout flexibility in the engine room). Further, the present embodiment can realize space saving in the engine room, and improve the workability when the brake apparatus 1 is mounted into the engine room. The master cylinder 4 and the stroke simulator 5 only have to overlap each other over a partial range when being projected vertically, but it is preferable to arrange the master cylinder 4 and the stroke simulator 5 in such a manner that a half or more of the stroke simulator 5 overlaps the master cylinder 4. In the present embodiment, the stroke simulator 5 is disposed immediately below the master cylinder 4, whereby they vertically overlap each other over a large area, which can enhance the above-described effect.

More specifically, the master cylinder 4 and the stroke simulator 5 are arranged in such a manner that the master cylinder 4 and the stroke simulator 5 overlap each other along the axial direction of the master cylinder 4 (the x-axis direction) (the master cylinder 4 and the stroke simulator 5 overlap each other as viewed from a direction perpendicular to the axis of the master cylinder 4). Arranging the master cylinder 4 and the stroke simulator 5 in such a manner that they overlap each other along the axial direction (the longitudinal direction) in this manner can prevent an increase in the dimension of the brake apparatus 1 in the axial direction of the master cylinder 4. Further, this arrangement allows the master cylinder 4 and the stroke simulator 5 to overlap each other when being viewed from above in the case where the master cylinder 4 is disposed in such a manner that the axis thereof extends in the front-rear direction of the vehicle. Therefore, the present embodiment can reduce the above-described occupied area of the brake apparatus 1.

Further, the master cylinder 4 and the stroke simulator 5 are arranged in such a manner that the axial direction of the master cylinder 4 and the axial direction of the stroke simulator 5 match each other (extend generally in parallel with each other). In other words, the axial direction (the longitudinal direction) of the master cylinder 4 and the axial direction (the longitudinal direction) of the stroke simulator 5 are conformed to each other (are oriented identically to each other). This arrangement can reduce an area defined by projecting the master cylinder 4 and the stroke simulator 5 as a whole from the axial direction of the master cylinder 4 compared to an arrangement in which their axial directions are mismatched (with an angle generated between the axes thereof). In other words, this arrangement can prevent an increase in the dimension of the brake apparatus 1 in a plane extending perpendicularly to the axis of the master cylinder 4 (the dimension of the entire apparatus in the direction perpendicular to the axis of the master cylinder 4). Further, this arrangement can minimize the dimension of the entire apparatus in the direction perpendicular to the axis of the master cylinder 4 when the master cylinder 4 and the stroke simulator 5 as a whole are viewed from the direction that is perpendicular to the axis of the master cylinder 4 and in which the axes of the master cylinder 4 and the stroke simulator 5 are located on a same straight line.

The master cylinder 4 and the stroke simulator 5 can overlap each other over an increased area as viewed from the direction perpendicular to the axis of the master cylinder 4 by being arranged in parallel (generally in parallel with each other) in such a manner that they overlap each other along the axial direction of the master cylinder 4 (the x-axis direction) (refer to FIG. 4). The present embodiment can increase the area over which the master cylinder 4 and the stroke simulator 5 overlap each other by arranging the master cylinder 4 and the stroke simulator 5 in such a manner that the axis of the master cylinder 4 and the axis of the stroke simulator 5 are located on the generally same straight line as viewed from above. Therefore, the present embodiment can further reduce the above-described occupied area of the brake apparatus 1.

The present embodiment is configured to maximize the area over which the master cylinder 4 and the stroke simulator 5 vertically overlap each other, thereby succeeding in minimizing the area defined by vertically projecting them as a whole and thus enhancing the above-describe effect. As illustrated in FIG. 4, the stroke simulator 5 (except for a part of the connection portion 50b, the flange portion 50c, and the like of the stroke simulator housing 50) is contained within a contour of the master cylinder 4 (the master cylinder housing 40) when being viewed from the z-axis direction. The master cylinder 4 (except for a part of the flange portion 40b) is contained in a contour of the reservoir tank 3. Therefore, as illustrated in FIG. 3, an area defined by vertically projecting the brake apparatus 1 (expect for the flange portion 40b of the master cylinder housing 40, the connection portion 50b of the stroke simulator housing 50, the pipe attachment portion 320, and the brake pipes 70 and 71) is generally equal to the area defined by vertically projecting the reservoir tank 3. Therefore, the present embodiment can reduce the area defined by vertically projecting the brake apparatus 1 as much as possible.

Further, the stroke simulator vale 6 is arranged in such a manner that the direction in which the valve body 640 (the plunger 64) of the stroke simulator vale 6 operates generally matches the direction in which the reaction force piston 51 of the stroke simulator 5 operates. In other words, the stroke simulator vale 6 is arranged in such a manner that axial direction of the stroke simulator vale 6 and the axial direction of the stroke simulator 5 match each other. This arrangement can reduce the area defined by projecting the stroke simulator vale 6 and the stroke simulator 5 as a whole from the axial direction of the stroke simulator 5 compared to an arrangement in which their axis directions do not match each other (an angle is generated between these axes). In other words, this arrangement can prevent the increase in the dimension of the brake apparatus 1 in a plane extending perpendicularly to the axis of the stroke simulator 5 (a dimension of the entire apparatus in a direction perpendicular to the axis of the stroke simulator 5). Therefore, the present embodiment can reduce the region occupied by the brake apparatus 1 (the occupied area) in the engine room as viewed from the front-rear direction, thereby succeeding in improving the mountability of the brake apparatus 1 onto the vehicle, in the case where the brake apparatus 1 is mounted in such a manner that the axis of the stroke simulator 5 extends in the front-rear direction of the vehicle. Further, arranging the stroke simulator valve 6 in such a manner that the axial directions of the stroke simulator vale 6 and the stroke simulator 5 match each other results in arranging the stroke simulator valve 6 in such a manner that the axial directions of the stroke simulator valve 6 and the master cylinder 4 match each other (extend generally in parallel with each other). Therefore, the present embodiment can further reduce the occupied area of the brake apparatus 1 when being viewed from above as described above.

The stroke simulator valve 6 is disposed at the position in the axial direction of the stroke simulator 5. In other words, the stroke simulator valve 6 is arranged so as to overlap the stroke simulator 5 as viewed from the axial direction (the x-axis direction). This arrangement can reduce the area defined by projecting the stroke simulator valve 6 and the stroke simulator 5 as a whole from the axial direction of the stroke simulator 5. In the present embodiment, the stroke simulator valve 6 is disposed generally coaxially with the stroke simulator 5. Therefore, the present embodiment can maximize the area over which the stroke simulator 5 and the stroke simulator valve 6 overlap each other to minimize the above-described projected area, as viewed from the axial direction (the x-axis direction). Further, the master cylinder 4 and the stroke simulator valve 6 are arranged so as to overlap each other along the x-axis direction. The master cylinder 4 and the stroke simulator valve 6 are arranged so as to overlap each other along the x-axis direction (the longitudinal direction) in this manner, which contributes to preventing the increase in the dimension of the brake apparatus 1 in the axial direction of the master cylinder 4. Further, this arrangement allows the master cylinder 4 and the stroke simulator valve 6 to overlap each other as viewed from the vertical direction, in the case where the brake apparatus 1 is mounted in such a manner that the axis of the master cylinder 4 extends in the front-rear direction of the vehicle. Therefore, the present embodiment can reduce the occupied area of the brake apparatus 1 when being viewed from above. The master cylinder 4 and the stroke simulator valve 6 only have to overlap each other over a partial range when being projected vertically, but it is preferable to arrange the master cylinder 4 and the stroke simulator valve 6 in such a manner that a half or more of the stroke simulator valve 6 overlaps the master cylinder 4. In the present embodiment, the stroke simulator valve 6 and the master cylinder 4 are arranged so as to vertically overlap each other over the maximized area to minimize the vertically projected area, which can enhance the above-described effect. As illustrated in FIG. 4, the stroke simulator valve 6 is contained within the contour of the master cylinder 4 (the master cylinder housing 40) when being viewed from the z-axis direction. The end of the stroke simulator valve 6 (the connector portion 610) on the positive side in the x-axis direction is located at a generally same position as the ends of the reservoir tank 3 and the master cylinder 4 on the positive side in the x-axis direction in terms of the x-axis direction. Therefore, the present embodiment can reduce the area defined by vertically projecting the brake apparatus 1 as much as possible.

The housing for the stroke simulator valve 6 and the housing for the stroke simulator 5 are integrated as the stroke simulator housing 50, which can further reduce the size of the entire brake apparatus 1 to improve the mountability onto the vehicle. Further, this configuration eliminates the necessity of a structure and a brake pipe for connecting the stroke simulator 5 and the stroke simulator valve 6 to each other, thereby succeeding in improving a fail-safe performance while simplifying the configuration to improve the workability of mounting the brake apparatus 1. The controller 8b, which controls the stroke simulator valve 6, is configured as a separate member from the brake apparatus 1, and is connected to the stroke simulator valve 6 via the harness. Therefore, the present embodiment can reduce the size of the brake apparatus 1 to allow the layout of the brake apparatus 1 to be more freely designed, compared to integrally preparing the brake apparatus 1 and the controller 8b. In other words, the layout flexibility of the brake apparatus 1 can be improved by the integration of the hydraulic controller for controlling the wheel cylinder hydraulic pressure, and the controller for controlling the stroke simulator valve 6 as the controller 8b.

The master cylinder 4, the stroke simulator 5, and the stroke simulator valve 6 are configured to be contained in the width (the dimension in the y-axis direction) of the flange portion 50c for mounting the brake apparatus 1 (the stroke simulator housing 50) onto the vehicle. Therefore, the present embodiment can also reduce the size of the brake apparatus 1 in the lateral direction of the vehicle (i.e., the direction perpendicular to the axes of the master cylinder 4 and the stroke simulator valve 6 as viewed from above). As a result, the present embodiment can further improve the mountability of the brake apparatus 1 onto the vehicle.

Further, the brake pipe 71, which connects the reservoir tank 3 and the stroke simulator 5 to each other, is laid so as to be contained in the width (the dimension in the y-axis direction) of the flange portion 50c. Therefore, the present embodiment can reduce the size of the brake apparatus 1 in the lateral direction of the vehicle, and thus can further improve the mountability of the brake apparatus 1 onto the vehicle. More specifically, the fastening portion 40d of the master cylinder housing 40 and the fastening portion 50i of the stroke simulator housing 50 are contained in the width (the dimension in the y-axis direction) of the flange portion 50c while protruding toward the positive side in the y-axis direction. The pipe attachment portions 320a and 580 are provided in spaces above and below the fastening portions 40d and 50i, respectively. Both the pipe attachment portions 320a and 580 are provided so as to be bent to be open to the positive side in the x-axis direction (not to the positive side in the y-axis direction) and to be also contained in the width (the dimension in the y-axis direction) of the flange portion 50c. The brake pipe 71 attached to the pipe attachment portions 320a and 580 is laid in the U-shaped manner bypassing the fastening portions 40d and 50i and the discharge port 44P. This configuration can prevent the brake pipe 71 from interfering with the fastening portion 40d and the like while allowing the brake pipe 71 to be contained in the width (the dimension in the y-axis direction) of the flange portion 50c. The brake pipe 71 is disposed so as not to protrude outwardly in the width direction beyond the flange portion 50c, which can prevent the brake pipe 71 from interfering with other members in the engine room. Therefore, the present embodiment can improve the mountability of the brake apparatus 1 onto the vehicle while protecting the brake pipe 71 from damages. Especially, the brake pipe 71 can be effectively protected from damages in the case where the brake pipe 71 is made of the flexible material (the material such as rubber).

The stroke simulator 5 is disposed below the master cylinder 4, and the reservoir 3 is disposed above the master cylinder 4 (the reservoir 3, the master cylinder 4, and the stroke simulator 5 are located in the order of the reservoir 3, the master cylinder 4, and the stroke simulator 5 from the top when the brake apparatus 1 is mounted on the vehicle). Therefore, the present embodiment can improve air removability of the brake apparatus 1. More specifically, a process for removing air (bubbles) from the brake apparatus 1 is performed at the time of mounting the brake apparatus 1 onto the vehicle or maintenance of the brake apparatus 1 (replacement of the brake fluid). The air can be easily removed through the air removal bleeder 57 from a portion of the simulator oil passage that is located on the stroke simulator 5 side (including the main chamber 54) with respect to the stroke simulator valve 6. The bleeder 57 is provided so as to be open at a positive side of the main chamber 54 (the cylindrical portion 50e) of the stroke simulator 5 in the z-axis direction, i.e., an upper portion where the air is easily accumulated. Therefore, the present embodiment can improve the air removability. On the other hand, the air can be removed through the master cylinder 4 (the hydraulic chamber 43P) and the reservoir tank 3 (the supply port 30) via the brake pipe 70, from a portion of the simulator oil passage that is located on the master cylinder 4 side with respect to the stroke simulator valve 6. The stroke simulator 5 is disposed below the master cylinder 4, and the reservoir tank 3 is disposed above the master cylinder 4. Therefore, the air (the bubbles) is lifted due to a buoyancy to be thereby easily removed from the reservoir tank 3 via the brake pipe 70 and the like. Therefore, the present embodiment can improve the air removability.

<Advantageous Effects of First Embodiment>

In the following description, some embodiments of the present invention that are perceivable from the first embodiment, and advantageous effects thereof will be listed.

(1) A brake apparatus is provided. This brake apparatus includes the master cylinder 4 provided in such a manner that the pistons 41 are axially operable in the master cylinder housing 40, and the stroke simulator 5 including the reaction force piston 51 axially operable by the brake fluid introduced into the stroke simulator housing 50. The master cylinder housing 40 is fixed to the stroke simulator housing 50.

In this manner, the master cylinder housing 40 and the stroke simulator housing 50 are prepare as separate members from each other, which eliminates the necessity of designing and manufacturing the housing of the entire brake apparatus 1 for each variation of the master cylinder 4. Therefore, this embodiment can improve the applicability to the wide range of vehicles.

(2) In the brake apparatus, the stroke simulator housing 50 includes the vehicle mounting surface 508 for mounting onto the vehicle.

This embodiment allows the master cylinder 4 and the stroke simulator 5 to be relatively easily mounted onto the vehicle via the stroke simulator housing 50.

(3) In the brake apparatus, the master cylinder housing 40 and the stroke simulator housing 50 include the joint surfaces (the outer peripheral surface of the fitting portion 40c and the like) for fixing them to each other integrally, respectively, and the joint surfaces include the socket-and-spigot portion.

This embodiment allows the master cylinder applicable to the wide range of vehicles to be used by the socket-and-spigot joint.

(4) In the brake apparatus, the master cylinder 4 and the stroke simulator 5 are arranged so as to overlap each other as viewed from the vertical direction in the orientation when the brake apparatus is mounted on the vehicle.

This embodiment can reduce the area occupied by the brake apparatus 1 as viewed from above, thereby improving the mountability onto the vehicle.

(19) A brake system is provided. The brake system includes the actuator 8 configured to control the wheel cylinder hydraulic pressure according to the state of the brake operation or the state of the vehicle, and the brake apparatus 1 prepared as a separate member from the actuator 8, and operable according to the brake operation of the driver. In this brake system, the brake apparatus 1 includes the master cylinder 4 configured to generate the brake hydraulic pressure by the brake operation of the driver, and the stroke simulator 5 configured to generate the simulative reaction force of the brake operation member according to the supply of the brake fluid delivered out of the master cylinder 4. The master cylinder 4 includes the master cylinder housing 40 provided in such a manner that the pistons 41 are axially operable in the master cylinder housing 40. The stroke simulator 5 includes the stroke simulator housing 50 containing the reaction force piston 51 axially operable by the brake fluid supplied therein. The master cylinder housing 40 is fixed to the stroke simulator housing 50.

This embodiment can provide similar advantageous effects to the one listed in the above-described item (1).

Second Embodiment

According to a second embodiment, the brake apparatus 1 is configured in such a manner that the stroke simulator 5 is arranged beside the master cylinder 4 when the brake apparatus 1 is mounted on the vehicle. First, a configuration thereof will be described. In the following description, features shared with the first embodiment will be identified by the same reference numerals with descriptions thereof omitted, and only different features will be described. FIGS. 11 to 18 illustrate the entire brake apparatus 1 according to the second embodiment from the respective same directions as FIGS. 1 to 8.

Figure 17:
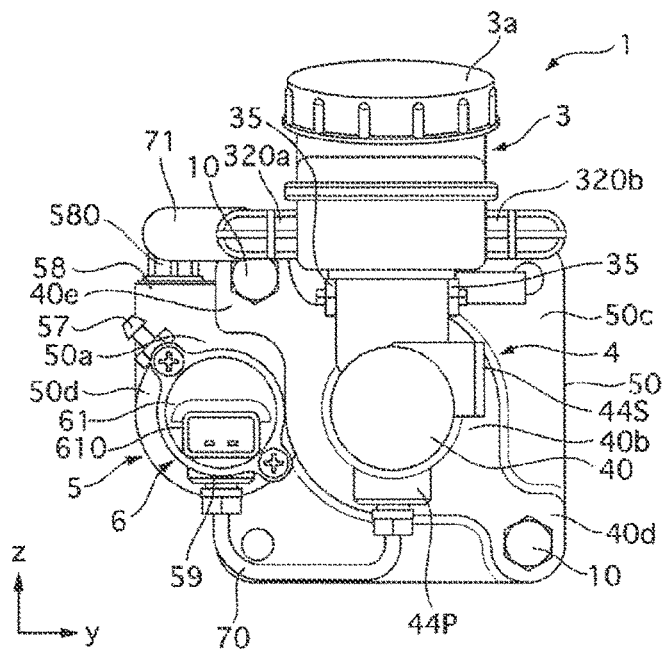
FIG. 17 is a front view of the brake apparatus 1 according to the second embodiment.

The pipe attachment portion 320a of the reservoir tank 3 is provided on the positive side in the x-axis direction and the negative side in the y-axis direction, and the pipe attachment portion 320b of the reservoir tank 3 is provided on the positive side in the x-axis direction and the positive side in the y-axis direction. The discharge ports 44P and 44S of the master cylinder housing 40 are open on a side surface on the positive side in the y-axis direction, and another discharge port 44P other than them is open on a side surface on the negative side in the z-axis direction. As illustrated in FIG. 17, the fastening portion 40d of the flange portion 40b of the master cylinder housing 40 is provided on the positive side in the y-axis direction and the negative side in the z-axis direction, and the fastening portion 40e of the flange portion 40b of the master cylinder housing 40 is provided on the negative side in the y-axis direction and the positive side in the z-axis direction. The air removal bleeder 57 of the stroke simulator housing 50 protrudes from the outer peripheral surface of the cylindrical portion 50e (refer to FIG. 14) toward the negative side in the y-axis direction and the positive side in the z-axis direction.

Figure 13:
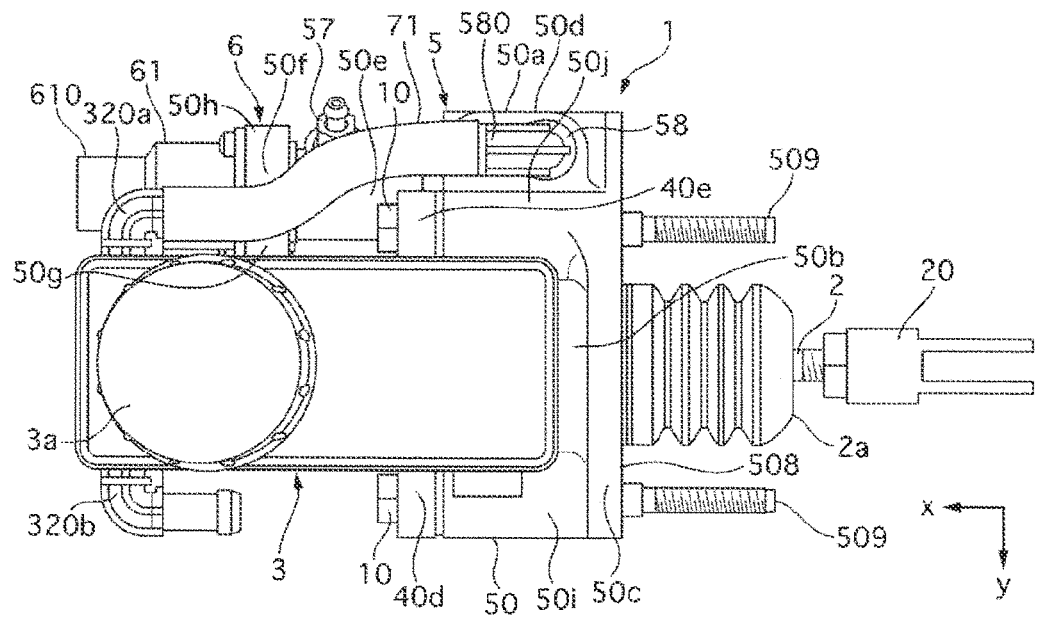
FIG. 13 is a top view of the brake apparatus 1 according to the second embodiment.
Figure 14:
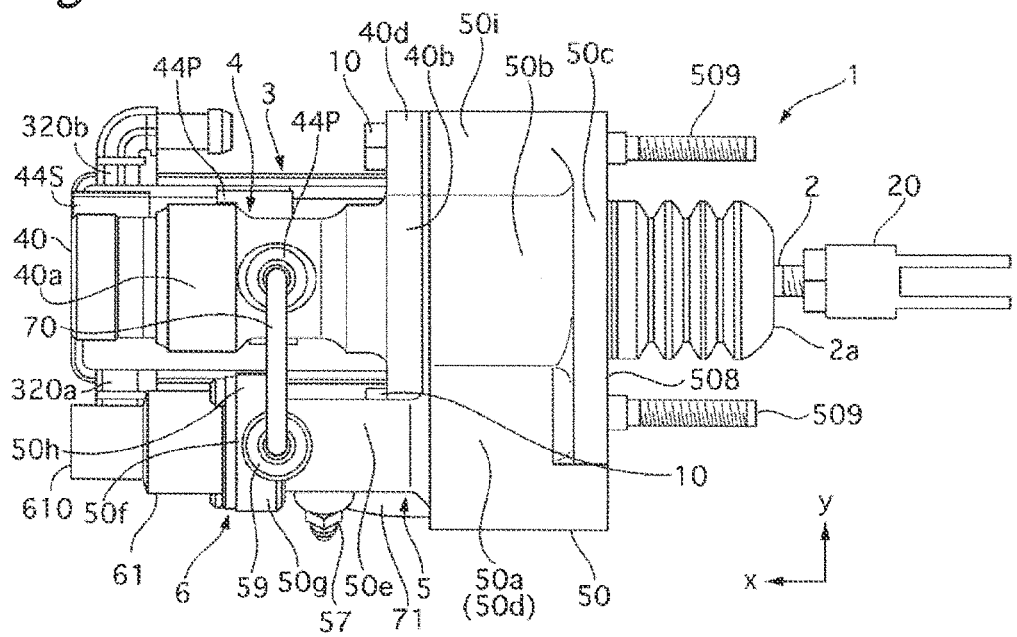
FIG. 14 is a bottom view of the brake apparatus 1 according to the second embodiment.
Figure 16:
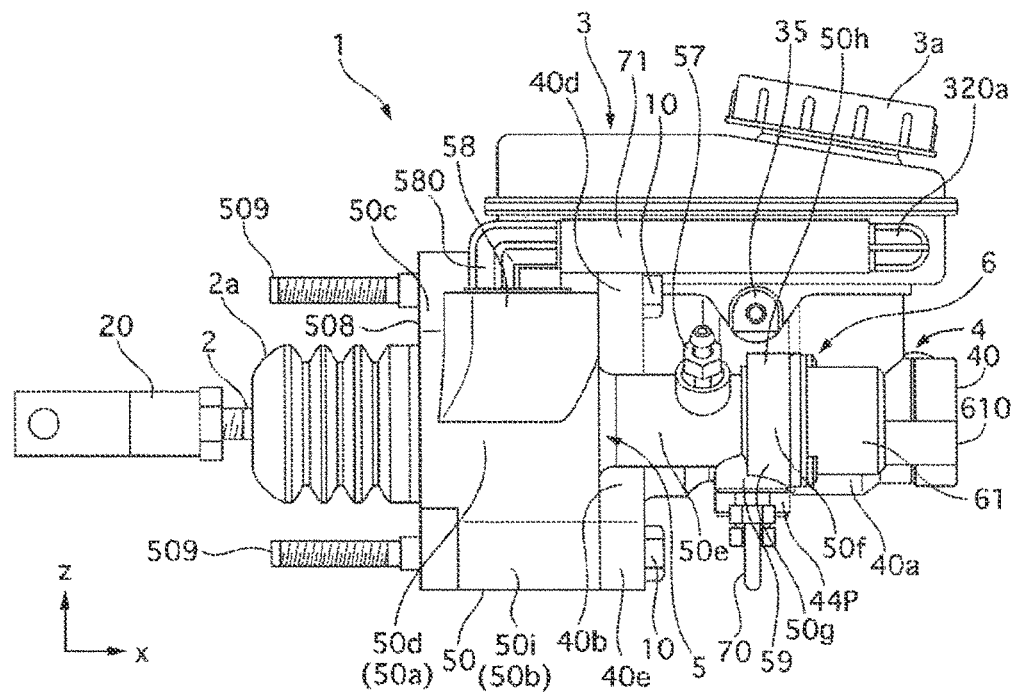
FIG. 16 is a side view of the brake apparatus 1 according to the second embodiment.

The connection port 58 (the pipe attachment portion 580) is provided on a positive side of the cylindrical portion 50d in the z-axis direction. The pipe attachment portion 580 protrudes from an outer surface of the cylindrical portion 50d that is located slightly on the negative side in the x-axis direction and the positive side in the z-axis direction, toward the positive side in the z-axis direction. The pipe attachment portion 580 is provided so as to be bent at an intermediate position toward the positive side in the x-axis direction and be open to the positive side in the x-axis direction. As illustrated in FIGS. 13 and 16, the brake pipe 71 is laid in an S-shaped manner as viewed from the positive side in the z-axis direction while extending in the x-axis direction. The brake pipe 71 extends from the pipe attachment portion 320a of the reservoir tank 3 toward the negative side in the x-axis direction and is inclined so as to be offset toward the negative side in the y-axis direction (be spaced away from the reservoir tank 3), and then extends again toward the negative side in the x-axis direction to be attached to the pipe attachment portion 580. The connection port 59 is provided so as to be open to the negative side in the z-axis direction. As illustrated in FIG. 17, the brake pipe 70 extends from the discharge port 44P of the master cylinder 4 on the negative side in the z-axis direction toward the negative side in the z-axis direction and is bent toward the negative side in the y-axis direction to extend generally in parallel with the y axis, and then is folded back again toward the positive side in the z-axis direction to be connected to the connection port 59.

The connection portion 50b of the stroke simulator housing 50 is provided on a portion of the main body portion 50a on the positive side in the y-axis direction. The fastening portion 50i is provided on the portion of the connection portion 50b on the positive side in the y-axis direction and the negative side in the z-axis direction, and the fastening portion 50j is provided on the portion of the connection portion 50b on the negative side in the y-axis direction and the positive side in the z-axis direction. The axial center of the main body portion 50a and the axial center of the connection portion 50b are located at the generally central positions of the flange portion 50c in the z-axis direction. The axial center of the connection portion 50b is located at the generally central position of the flange portion 50c in the y-axis direction. The axial center of the main body portion 50a is located in the vicinity of a negative side of the flange portion 50c in the y-axis direction. The height (the dimension in the z-axis direction) of the flange portion 50c is greater than the height (the dimension in the z-axis direction) of the main body portion 50a and the main body portion 40a of the master cylinder housing 40. Further, the heights (the dimensions in the z-axis direction) of the connection portion 50b and the flange portion 40b of the master cylinder housing 40 are generally equal to each other. Further, the flange portion 50c is formed in such a manner that the width (the dimension in the y-axis direction) of the flange portion 50c is greater than the width (the dimension in the y-axis direction) of the reservoir tank 3, and is generally equal to the width (the dimension in the y-axis direction) of the connection portion 50b and the flange portion 40b of the master cylinder housing 40. More specifically, as illustrated in FIGS. 13 and 17, the outer circumferential edges of the fastening portions 50*i* and 50*j* of the connection portion 50*b* or the fastening portions 40*d* and 40*e* of the flange portion 40*b* are generally in alignment with the outer circumferential edge of the flange portion 50*c* (they are located on generally same positions in each of the y-axis direction and the z-axis direction).

The master cylinder 4 and the stroke simulator 5 are arranged so as to be located side by side when the brake apparatus 1 is mounted on the vehicle. In other words, the master cylinder 4 and the stroke simulator 5 are arranged integrally so as to overlap each other as viewed from the lateral direction when the brake apparatus 1 is mounted on the vehicle. The reservoir tank 3 is disposed above the master cylinder 4 when the brake apparatus 1 is mounted on the vehicle. The stroke simulator 5 is disposed beside the master cylinder 4 (on the negative side in the y-axis direction) with the axial direction of the master cylinder 4 and the axial direction of the stroke simulator 5 (including the stroke simulator valve 6, the same applies hereinafter) matching each other (in other words, extending in parallel with each other). As illustrated in FIG. 17, the master cylinder 4 and the stroke simulator 5 are arranged in such a manner that the axis of the master cylinder 4 and the axis of the stroke simulator 5 are in alignment with each other along a generally same straight line in parallel with the y axis, as viewed from the x-axis direction when the brake apparatus 1 is mounted on the vehicle. Therefore, the master cylinder 4 and the stroke simulator 5 overlap each other over a maximum range as viewed from the lateral direction when the brake apparatus 1 is mounted on the vehicle. This arrangement minimizes an area defined by projecting the master cylinder 4 and the stroke simulator 5 in the lateral direction.

The connection port 58 of the stroke simulator housing 50 is provided so as to protrude toward the positive side in the z-axis direction, on the negative side of the brake apparatus 1 in the y-axis direction, and an end of the connection port 58 on the negative side in the y-axis direction is located in the vicinity of an edge of an end of the cylindrical portion 50*d* on the negative side in the y-axis direction (does not protrude toward the negative side in the y-axis direction beyond the cylindrical portion 50*d*). The end of the brake pipe 71 attached to the pipe attachment portion 580 on the negative side in the y-axis direction also does not protrude toward the negative side in the y-axis direction beyond the cylindrical portion 50*d*. The end of the pipe attachment portion 320*b* on the positive side in the y-axis direction is located in the vicinity of the edge of the end of the flange portion 50*c* on the positive side in the y-axis direction, on the positive side of the brake apparatus 1 in the y-axis direction. The pipe attachment portion 320*b* protrudes from the side of the flange portion 50*c* on the positive side in the y-axis direction (toward the positive side in the y-axis direction) by only a small amount.

As illustrated in FIGS. 16 and 17, the master cylinder 4 (the main body portion 40*a* and the flange portion 40*b* of the master cylinder housing 40), and the stroke simulator 5 (the main body portion 50*a* and the connection portion 50*b* of the stroke simulator housing 50) are configured to be contained in the height (the dimension in the z-axis direction) of the flange portion 50*c*. The brake pipes 70 and 71 are laid so as to be contained in the height (the dimension in the z-axis direction) of the reservoir tank 3, the master cylinder 4, and the stroke simulator housing 50. For example, the brake pipe 71 does not protrude toward the positive side in the z-axis direction beyond the reservoir tank 3. Further, the brake pipe 70 is laid so as to be contained in the height (the dimension in the z-axis direction) of the flange portion 50*c*. More specifically, the brake pipe 70 is laid so as to extend generally in parallel with the y axis (generally in parallel with the side of the flange portion 50*c* on the negative side in the z-axis direction), and the brake pipe 70 (the end thereof on the negative side in the z-axis direction) is located in the vicinity of the edge of the end of the flange portion 50*c* on the negative side in the z-axis direction (does not protrude toward the negative side in the z-axis direction beyond the flange portion 50*c*).

Figure 15:
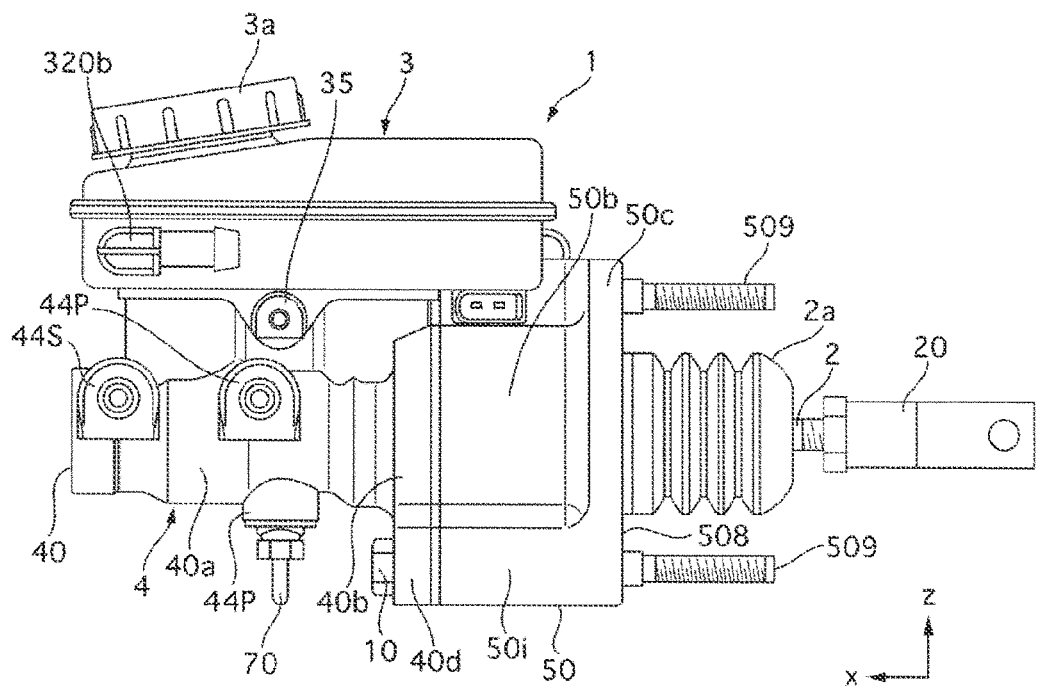
FIG. 15 is a side view of the brake apparatus 1 according to the second embodiment.
Figure 18:
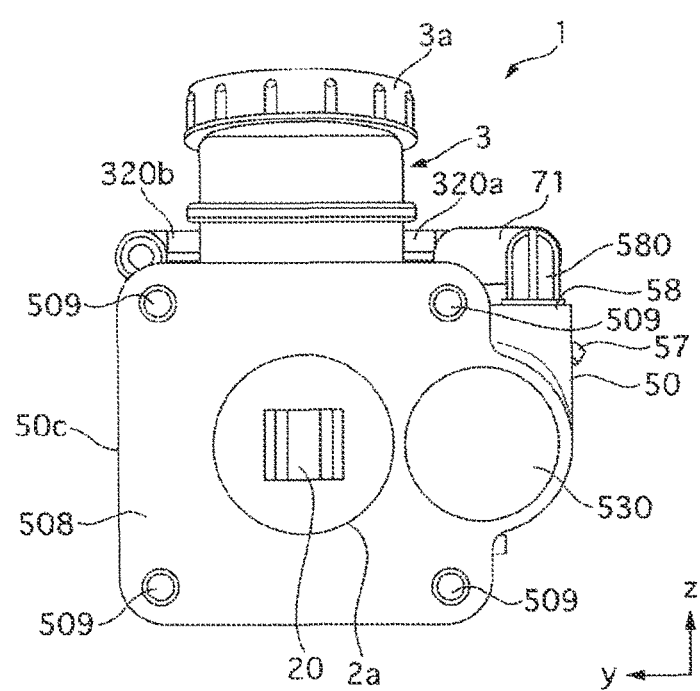
FIG. 18 is a rear view of the brake apparatus 1 according to the second embodiment.

As illustrated in FIG. 15, the stroke simulator 5 (except for the connection portion 50*b* and the flange portion 50*c* of the stroke simulator housing 50) is invisible because it is hidden by the master cylinder 4, when the brake apparatus 1 is viewed from the positive side in the y-axis direction. The brake pipe 71 is invisible because it is hidden by the reservoir tank 3. As illustrated in FIG. 18, the master cylinder 4, generally the half of the stroke simulator 5 (the main body portion 50*a* of the stroke simulator housing 50), and a large part of the brake pipe 70 are invisible because they are hidden by the flange portion 50*c*, when the brake apparatus 1 is viewed from the negative side in the x-axis direction.

Next, functions will be described. The master cylinder 4 and the stroke simulator 5 are arranged so as to overlap each other as viewed from the lateral direction (located on the left side and the right side) when the brake apparatus 1 is mounted on the vehicle. This arrangement can reduce the area defined by projecting the brake apparatus 1 in the lateral direction. As a result, the present embodiment can reduce a region occupied by the brake apparatus 1 (an occupied area) in the engine room when being viewed from the lateral direction, thereby improving the mountability of the brake apparatus 1 onto the vehicle. Further, the present embodiment can realize space saving in the engine room. In other words, the present embodiment can reduce the vertical dimension of the brake apparatus 1. Therefore, for example, the brake apparatus 1 can be easily applied to a compact vehicle. The master cylinder 4 and the stroke simulator 5 only have to overlap each other over a partial range when being projected in the lateral direction, but it is preferable to arrange the master cylinder 4 and the stroke simulator 5 in such a manner that the half or more of the stroke simulator 5 overlaps the master cylinder 4. In the present embodiment, the stroke simulator 5 is disposed right beside the master cylinder 4, so that the master cylinder 4 and the stroke simulator 5 overlap each other over a maximized area in the lateral direction, which can enhance the above-described effect. As illustrated in FIGS. 15 and 16, the stroke simulator 5 (except for the connection portion 50*b* and the flange portion 50*c* of the stroke simulator housing 50) and the stroke simulator valve 6 are contained in the contour of the master cylinder 4 when being viewed from the y-axis direction. Therefore, the area defined by projecting the brake apparatus 1 in the lateral direction (except for the connection portion 50*b* of the stroke simulator housing 50, and the brake pipe 70) is generally equal to the area defined by projecting the master cylinder 4 and the reservoir tank 3 in the lateral direction.

The master cylinder 4 and the stroke simulator 5 (and the stroke simulator valve 6) are configured to be contained in the height (the dimension in the z-axis direction) of the flange portion 50*c*. Therefore, the present embodiment can also reduce the size of the brake apparatus 1 in the vertical direction of the vehicle. As a result, the present embodiment can further improve the mountability of the brake apparatus 1 onto the vehicle. Further, the brake pipes 70 and 71 are laid so as to be contained in the height (the dimension in the z-axis direction) of the reservoir tank 3, the master cylinder housing 40, and the stroke simulator housing 50. For example, the brake pipe 70, which connects the master cylinder 4 and the stroke simulator 5 to each other, is laid so as to be contained in the height (the dimension in the z-axis direction) of the flange portion 50c. Therefore, the present embodiment can reduce the size of the brake apparatus 1 in the vertical direction of the vehicle, and further improve the mountability of the brake apparatus 1 onto the vehicle. Further, as illustrated in FIG. 17, the brake pipe 71, which connects the reservoir tank 3 and the stroke simulator 5 to each other, is laid so as to be contained in a recessed portion (a dead space) formed on the negative side of the reservoir tank 3 in the y-axis direction and a positive side of the stroke simulator 5 in the z-axis direction. Therefore, the present embodiment can improve the mountability of the brake apparatus 1 onto the vehicle while preventing the brake pipe 71 from interfering with the other members in the engine room.

Besides them, the second embodiment can provide similar advantageous effects to the first embodiment due to the similar configuration to the first embodiment.

Other Embodiments

Having described embodiments for embodying the present invention based on the first embodiment and the second embodiment, the specific configuration of the present invention is not limited to the first embodiment and the second embodiment, and the present invention includes even a change in the design or the like within a range that does not deviate from the gist of the present invention. For example, the stroke simulator 5 (the main body portion 50a) may be arranged so as to overlap the master cylinder 4 in the front-rear direction of the vehicle when the brake apparatus 1 is mounted on the vehicle. For example, the stroke simulator 5 (the main body portion 50a) may be disposed on the positive side in the x-axis direction with respect to the master cylinder 4 among horizontal positions of the master cylinder 4. In this case, the applicability to the wide range of vehicles can be improved by preparing the master cylinder housing 40 as a separate member form the stroke simulator housing 50. Further, as illustrated in FIG. 9, a spring 23 (a disc spring or the like) as a damper may be installed between an end of the master cylinder housing 40 (the fitting portion 40c) on the negative side in the x-axis direction and the flange portion 21 of the push rod 2 (the outer periphery of the piston 41P). When the brake pedal is operated by a predetermined amount or more, the flange portion 21 is brought into abutment with an end of the spring 23 on the negative side in the x-axis direction, so that the spring 23 is pressed and compressed by the flange portion 21 from the negative side in the x-axis direction. The compressed and deformed spring 23 applies a reaction force to the brake pedal via the push rod 2, thereby adjusting the force of operating the brake pedal. Therefore, this configuration allows the brake apparatus to exhibit a preferable characteristic over an entire region in terms of the amount of the operation performed on the brake pedal operation. For example, suppose that the link type booster using the link mechanism is mounted between the brake pedal and the clevis 20, instead of causing the actuator 8 to function as the booster. If the link mechanism is set to have a characteristic that allows a predetermined boosting capability to be acquired under restrictions and conditions when the brake apparatus 1 is mounted, this may result in a failure to acquire the preferable brake characteristic (a relationship among the pressing force, the stroke, and the deceleration), such as an excessive increase in a lever ratio in a pedal stroke region at the late stage of the brake operation. In contrast, installing the spring 23 can increase the pedal reaction force to damp the pressing force due to the spring 23 pressed and compressed at the late stage of the brake operation, thereby succeeding in achieving the preferable brake characteristic over the entire region in terms of the amount of the operation performed on the brake pedal.

In the following description, other embodiments of the present invention that are perceivable from the above-described embodiments will be listed.

(5) The brake apparatus further includes the reservoir tank configured to supply the brake fluid to the master cylinder, and the stroke simulator is disposed below the master cylinder, and the reservoir tank is disposed above the master cylinder.

(6) In the brake apparatus, the master cylinder and the stroke simulator are arranged in such a manner that the axial direction of the master cylinder and the axial direction of the stroke simulator match each other.

(7) The brake apparatus further includes the stroke simulator valve for limiting the flow of the brake fluid into the stroke simulator. The stroke simulator valve is disposed coaxially with the stroke simulator.

(8) In the brake apparatus listed in the above item (7), the stroke simulator valve is arranged so as to overlap the master cylinder as viewed from the vertical direction.

(9) In the brake apparatus listed in the above item (8), the stroke simulator housing includes the vehicle mounting surface for mounting onto the vehicle, and the vehicle mounting surface has the predetermined width. The master cylinder and the stroke simulator are configured to be contained in the width of the flange portion.

(10) In the brake apparatus listed in the above item (9), the brake apparatus further includes the reservoir tank disposed above the master cylinder and configured to store the brake fluid, and the brake pipe connecting the reservoir tank and the stroke simulator to each other. The brake pipe is laid so as to be contained in the width of the flange portion.

(11) The brake apparatus includes the master cylinder disposed in the axial hole formed in the master cylinder housing having the closed one-end side, and configured to generate the brake hydraulic pressure by the axial operation of the piston in the hole, and the stroke simulator disposed in the axial hole formed in the stroke simulator housing having the closed one-end side, and configured to generate the simulative reaction force of the brake operation member by causing the reaction force piston to axially operate in the hole according to the supply of the brake fluid delivered out of the master cylinder. The master cylinder housing is configured to be fixed to the stroke simulator housing, and fixed to the vehicle via the stroke simulator housing.

(12) In the brake apparatus listed in the above item (11), the master cylinder housing and the stroke simulator housing include the joint surfaces for fixing them to each other, respectively, and the joint surfaces include the socket-and-spigot portion.

(13) In the brake apparatus listed in the above item (11), the master cylinder and the stroke simulator are arranged in parallel with each other.

(14) In the brake apparatus listed in the above item (13), the master cylinder and the stroke simulator are arranged so as to be located one above another in the orientation when the brake apparatus is mounted on the vehicle.

(15) In the brake apparatus listed in the above item (14), the brake apparatus further includes the reservoir tank configured to supply the brake fluid to the master cylinder. The reservoir tank, the master cylinder, and the stroke simulator are arranged so as to be located in the order of the reservoir tank, the master cylinder, and the stroke simulator from the top in the orientation when the brake apparatus is mounted on the vehicle.

(16) In the brake apparatus listed in the above item (15), the brake apparatus further includes the stroke simulator valve for limiting the flow of the brake fluid into the stroke simulator. The stroke simulator valve is arranged in such a manner that the axis of the stroke simulator valve is oriented in the same direction as the axis of the stroke simulator.

(17) In the brake apparatus listed in the above item (16), the stroke simulator valve includes the axially operable valve body, and the stroke simulator valve is arranged in such a manner that the direction in which the valve body operates and the direction in which the reaction force piston operates match each other.

(18) In the brake apparatus listed in the above item (11), the stroke simulator housing includes the fixation flange for fixation to the vehicle, and the master cylinder and the stroke simulator are configured to be contained in the width of the fixation flange.

(20) In the brake apparatus listed in the above item (19), the brake apparatus further includes the stroke simulator valve for limiting the flow of the brake fluid into the stroke simulator, and the controller configured to control the stroke simulator valve. The master cylinder and the stroke simulator are arranged so as to overlap each other as viewed from the vertical direction in the orientation when the brake system is mounted on the vehicle. The controller is configured as a separate member from the master cylinder. The stroke simulator valve and the controller are connected to each other via the harness.

This application claims priority to Japanese Patent Application No. 2013-111160 filed on May 27, 2013. The entire disclosure of Japanese Patent Application No. 2013-111160 filed on May 27, 2013 including the specification, the claims, the drawings, and the summary is incorporated herein by reference in its entirety.

REFERENCE SIGNS LIST 1 brake apparatus
4 master cylinder
40 master cylinder housing
40c fitting portion
41 piston
5 stroke simulator
50 stroke simulator housing
50B vehicle mounting surface
51 reaction force piston
8 actuator

The invention claimed is:

1. A brake apparatus comprising:
a master cylinder provided in such a manner that a piston is axially operable in a master cylinder housing; and
a stroke simulator including a stroke simulator housing, and a reaction force piston axially operable by brake fluid introduced into the stroke simulator housing formed separately from the master cylinder housing,
wherein the master cylinder housing is fixed to the stroke simulator housing,
wherein the stroke simulator housing is positioned between the master cylinder housing and a fixation piece structured to fix the stroke simulator housing to a vehicle,
wherein the fixation piece is spaced from the master cylinder housing such that the stroke simulator housing is located between the fixation piece and the master cylinder housing in a direction in which the master cylinder and the stroke cylinder are arranged,
wherein the fixation piece is fixed to the stroke simulator housing, and
wherein the reaction force piston is housed entirely in the stroke simulator housing.

2. The brake apparatus according to claim 1, wherein the stroke simulator housing includes a vehicle mounting surface for mounting onto the vehicle.

3. The brake apparatus according to claim 1, wherein the master cylinder housing and the stroke simulator housing include joint surfaces for fixing them to each other integrally, respectively, and
wherein the joint surfaces include a socket-and-spigot portion.

4. The brake apparatus according to claim 1, wherein the master cylinder and the stroke simulator are arranged so as to overlap each other as viewed from a vertical direction in an orientation when the brake apparatus is mounted on the vehicle.

5. The brake apparatus according to claim 1, further comprising a reservoir tank configured to supply the brake fluid to the master cylinder,
wherein the stroke simulator is disposed below the master cylinder, and the reservoir tank is disposed above the master cylinder.

6. The brake apparatus according to claim 1, wherein the master cylinder and the stroke simulator are arranged in such a manner that an axial direction of the master cylinder and an axial direction of the stroke simulator match each other.

7. The brake apparatus according to claim 1, further comprising a stroke simulator valve for limiting a flow of the brake fluid into the stroke simulator,
wherein the stroke simulator valve is disposed coaxially with the stroke simulator.

8. The brake apparatus according to claim 7, wherein the stroke simulator valve is arranged so as to overlap the master cylinder as viewed from a vertical direction.

9. The brake apparatus according to claim 8, wherein the stroke simulator housing includes a flange portion structured to mount the stroke simulator housing onto the vehicle,
wherein the flange portion includes a vehicle mounting surface for mounting onto the vehicle, the vehicle mounting surface having a predetermined width, and
wherein the master cylinder and the stroke simulator are configured to be contained in the width of the flange portion.

10. The brake apparatus according to claim 9, further comprising:
a reservoir tank disposed above the master cylinder, the reservoir tank being configured to store the brake fluid; and
a brake pipe connecting the reservoir tank and the stroke simulator to each other, and
wherein the brake pipe is laid so as to be contained in the width of the flange portion.

11. A brake system comprising:
an actuator configured to control a wheel cylinder hydraulic pressure; and
a brake apparatus formed separately from the actuator, the brake apparatus being operable according to a brake operation of a driver, the brake apparatus including:

a master cylinder configured to generate a brake hydraulic pressure by the brake operation of the driver; and a stroke simulator configured to generate a simulative reaction force of a brake operation member according to a supply of brake fluid delivered out of the master cylinder, wherein the master cylinder includes a master cylinder housing provided in such a manner that a piston is axially operable in the master cylinder housing, wherein the stroke simulator includes a stroke simulator housing containing a reaction force piston axially operable by the brake fluid supplied therein and formed separately from the master cylinder housing, wherein the master cylinder housing is fixed to the stroke simulator housing, wherein the stroke simulator housing is positioned between the master cylinder housing and a fixation piece structured to fix the stroke simulator housing to a vehicle, wherein the fixation piece is spaced from the master cylinder housing such that the stroke simulator housing is located between the fixation piece and the master cylinder housing in a direction in which the master cylinder and the stroke cylinder are arranged, wherein the fixation piece is fixed to the stroke simulator housing, and wherein the reaction force piston is housed entirely in the stroke simulator housing.

12. The brake system according to claim 11, further comprising:

a stroke simulator valve for limiting a flow of the brake fluid into the stroke simulator; and a controller configured to control the stroke simulator valve, wherein the master cylinder and the stroke simulator are arranged so as to overlap each other as viewed from a vertical direction in an orientation when the brake system is mounted on the vehicle, wherein the controller is configured as a separate member from the master cylinder, and wherein the stroke simulator valve and the controller are connected to each other via a harness.

* * * * *